Aug. 31, 1937.　　　H. P. BOSWAU　　　2,091,301
SUPERVISORY CONTROL SYSTEM
Filed July 3, 1931　　　4 Sheets-Sheet 1

INVENTOR
Hans P. Boswau.
ATTORNEY

Aug. 31, 1937.   H. P. BOSWAU   2,091,301
SUPERVISORY CONTROL SYSTEM
Filed July 3, 1931   4 Sheets-Sheet 4

INVENTOR
Hans P. Boswau.
BY
W. R. Coley
ATTORNEY

Patented Aug. 31, 1937

2,091,301

UNITED STATES PATENT OFFICE 2,091,301

SUPERVISORY CONTROL SYSTEM

Hans P. Boswau, Galion, Ohio, assignor to The North Electric Manufacturing Company, Galion, Ohio, a corporation of Ohio Application July 3, 1931, Serial No. 548,595

35 Claims. (Cl. 177—353)

My invention relates to signalling systems and more particularly to apparatus for and methods of operating supervisory control systems.

An extremely important item of cost in the supervisory control systems is the number of signalling lines which are necessary for satisfactory operation. Heretofore it has been generally regarded necessary to provide more than one signalling channel between the main station and the substation such as a control line, a supervisory line, a drive or synchronizing line and a common return, making a total of four conductors. This has been particularly regarded necessary in those systems where visual indication of the remote selection and operation is desired. I have discovered that visual supervisory indication, both of selection and operation, as well as direct control and synchronization, may all be obtained over a single signalling circuit.

Accordingly, an object of my invention is to provide a novel supervisory control system in which a single signalling channel or circuit is employed for remote synchronous selection, checking of selection, direct operation, and visual supervision of remotely disposed apparatus units.

Still a further object of my invention is to provide novel and improved apparatus for and methods of supervisory control.

In addition to the reduction of cost of the supervisory control system by decreasing the number of lines, it is also desirable to reduce the cost of the selecting equipment. Where, however, a maximum of safeguarding against inaccurate operation is desired, the amount of selecting apparatus increases enormously. Increase in the amount of apparatus means increased complications and added dangers of breakdown, thus, to a degree, defeating the very purpose of the additional selecting apparatus.

Accordingly, a further object of my invention is to provide novel signalling circuits whereby the synchronous selection of remotely disposed apparatus units, the checking of the selection operation, control of the selected units, and supervision of the operated selected unit, are all performed by a common set of selecting apparatus.

Still a further object of my invention is to provide simplified common equipment for selecting remotely disposed apparatus units, checking the selection, operating the selecting unit by a code, and supervising the operating unit.

Still another object of my invention is to provide novel selecting apparatus and circuit arrangements for switching the function of the selecting apparatus successively to select, check the selection, control and supervise apparatus units.

A further object is to provide in one embodiment of my invention novel circuit arrangements including normally energized line relays for controlling the operation of the selecting apparatus.

A still further object of my invention is to provide novel circuit arrangements in a supervisory control system for automatically resetting the system to a normal condition when any point selection fails to check.

Another object of my invention is to provide novel circuit arrangements in a supervisory control system for automatically resetting the apparatus to normal in the event that the office battery is lost, either momentarily or for an extended period of time.

Still a further object of my invention is to provide means for automatically checking all selecting points in the event that the battery is lost either at the office or substations or both.

Still another object of my invention is to provide means whereby the selecting apparatus is non-responsive to any impulses other than the regular signalling impulses.

Another object of my invention is to provide novel protective means against false operations or indications when the batteries at either station are interrupted rapidly, simulating impulses.

Still a further object of my invention is to provide means in a supervisory control system which is not equipped with finder switches for preventing loss of signals by reason of simultaneous operation of a sender at a substation or the office or by simultaneous operation of more than one circuit breaker.

Another object of my invention is to provide novel means against loss of signals when the office and substation start simultaneously.

Still a further object of my invention is to provide novel circuit arrangements which prevent supervisory indications when either the battery at the office or substation fails during the sending of impulses or in the event that the line opens.

There are other objects of my invention, which, together with the foregoing objects, will appear in the detailed description which is to follow.

In general my invention comprises a single signalling channel or a trunk line of two wires extending between the dispatcher's office and a distant station. When a circuit breaker at a predetermined station is in the trip position and the dispatcher desires to close it, he first operates a twist type control key to the closed position and then presses a non-locking push button. The key and push buttons are individual to the control point selected. This causes the ultimate operation of the relay means associated with that point, which relay means determine the code to be transmitted to the remote station.

The codes comprise a plurality of series of impulses, one series of impulses functioning to select the particular point or breaker to be operated.

Following the transmission of the point selecting impulses, a point selecting relay individual to the particular circuit breaker to be operated is energized and it, as a result, provides certain connections between the circuit breaker selected and the master control circuits. As soon as this point selecting relay is energized, a series of point selecting checking impulses are transmitted back to the dispatching office. In response to these impulses, a point selecting checking relay at the office is energized, and, as a result, the control and supervisory circuits of the selected circuit breaker are connected to the master circuits.

When the point checking relay at the office has been energized, the code transmitting relays at the office which have been transmitting the series of impulses, as described above, are released from further operation. The dispatcher is advised of the proper selection at the substation and of the successful check of this selection by the lighting of a check lamp associated with the selected breaker.

The master control key is now momentarily depressed and, as a result, code combinations of impulses are transmitted to the substation for operating the selected circuit breaker. It should be noted, at this time, that the final operating code combination of impulses was not transmitted until the group and point selection of the breaker, has been checked at the office and the dispatcher is certain to which particular breaker he is connected for operation.

In response to the operation of code combinations of impulses, the selected breaker is operated from its tripped to its closed position. As a result, contacts on the circuit breaker auxiliary switch complete a circuit for operating the code transmitting means at the substation for transmitting a code combination of impulses to the office in accordance with the new condition of the circuit breaker. At the office, code responsive means are operated in response to this code combination of impulses to in turn operate a lamp relay which will indicate that the circuit breaker has been closed.

Following the receipt of the supervisory signal indicating the new condition of the breaker, a special impulse is automatically transmitted from the office, differing in character from the signalling impulses and, in response to this special impulse, the equipment at the office and substations is restored to normal condition. In the particular embodiment of my invention which I have illustrated in the drawings, I employ a specially long impulse for this purpose although it will be understood that any other special impulse may be used.

In the event that a circuit breaker is automatically tripped from its closed to its open position, a series of code combinations of impulse conditions is transmitted from the substation at which the circuit breaker is located to the dispatching office. The first code combination of impulses transmitted from the substation to the dispatching office is in accordance with the particular breaker which has tripped and at the office a relay individual to this breaker is operated in response to this code combination of impulse conditions.

As a result of the energization of this relay a point selection check code combination is transmitted back to the substation.

In response to this point selection checking code combination, a circuit is set up at the substation for associating the operated circuit breaker with the signal circuit or channel. At this time the individual supervisory relay at the office has also been associated with this same channel in response to the operation of the point selecting relay.

A code combination of impulses is now transmitted from the transmitting equipment controlled by the circuit breaker in accordance with the condition of the breaker to the office. In response to this received code combination of impulse conditions, the supervisory relay is operated to indicate the new condition of the breaker. As, in the case of the operation of the circuit breaker by the dispatcher, following the operation of the supervisory relay a special impulse is transmitted from the office, similar in character to the previous combination impulse for restoring the selected apparatus to normal.

Referring to the drawings.

Figure 1:
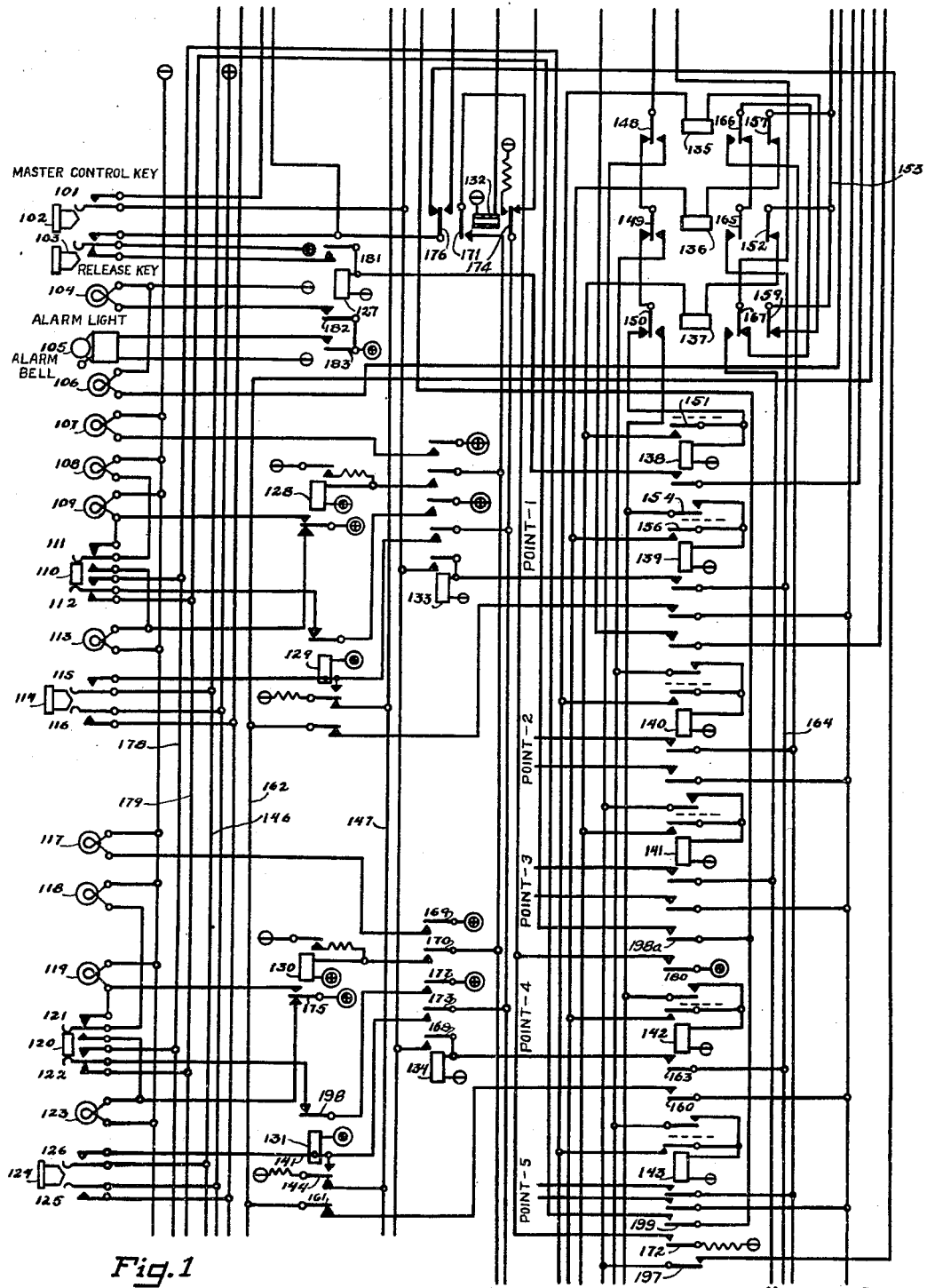
Figure 1 is a circuit diagram of the individual equipment and selecting relays at the office.

In Figure 1, I have disclosed diagrammatically the apparatus which, in practice, is located on the dispatcher's control panel in the office and which comprises a common or master equipment and the equipment individual to each apparatus. The master equipments, which are designated on the drawings according to their individual functions, include the master control key 101 which is of the push-non-lock type and is designated "master control key". This key when depressed, applies battery at its closed contacts to the operation control circuit. After the desired apparatus has been selected, the master control key is, as will be hereinafter described, momentarily depressed.

The release key 103 is a non-lock type key designated "release key". This key is associated with a light alarm 104 and bell alarm 105 and also functions to control the release of all of the relay equipment, as will appear hereinafter.

When an automatic trip operation occurs, the alarm light 104 and the alarm bell 105 are energized to notify the dispatcher that an operation is being reported and the bell will continue to give an alarm until the release key is momentarily depressed. After the dispatcher observes the operation that has taken place, he momentarily depresses the release key 103 which releases the alarm circuit.

A lamp 106 is also provided to indicate that code sending has been initiated from the office while the lamp 104 indicates code sending initiated from the substation.

The individual equipment required for each control point is, in practice, mounted upon key plates. These key plates are designated to correspond to the operation that the key controls. In practice, card holders are mounted at the top of each key plate to allow the dispatcher to designate the various key plates as desired.

For each point equipment for control and supervision, the individual equipment supplied includes one individual control key such, for example, as 110 which is of the twist type and which remains in whichever position it is placed. The setting of his control key determines what operation is to be performed on the selected remote substation device.

One large red supervisory lamp 109 is provided which, when illuminated indicates that the associated unit at the substation is in its closed position. One large green supervisory lamp 113 is provided which, when illuminated, indicates that the associated unit at the substation is in its open position. A small white and black dot guard lamp 108 is provided which is illuminated when the setting of the individual control key such as 110 disagrees with the position of the associated unit at the distant station; that is, assuming that the dispatcher has operated the individual control key to the closed position, as a result of which the breaker has closed, but that, thereafter, the breaker opens automatically due to the operation of protective devices at the remote station, the disagreement lamp will glow.

Thus the guard lamp 108 is illuminated in addition to the green supervisory lamp 113 to indicate to the dispatcher that an automatic operation has occurred at the substation and that, accordingly, the setting of the control key and individual lamp do not agree. This is necessary in order to prevent unexpected remote operation, in the event that the selection of a remote unit is made and the dispatcher fails to note that the individual control key position does not agree with the condition of the unit. A check lamp 107 is also provided, which is illuminated when the relay chain has completed the operation of the point selecting relays at the office and distant station. These check lamps are energized under control of the selection relays at the dispatcher's office.

The individual point equipment is the same for each of the other points, except that for these points equipped for supervision only, no control key or guard lamp are provided.

The individual equipment is also provided with a point operate key 114, which is a push-non-lock type of key. This key, upon being depressed, controls the individual point relay 129 (to be described hereinafter) to start the apparatus and determine the selection code to be sent. Depression of this key also controls energization of relay 216 (to be described hereinafter) for enabling the apparatus to distinguish between operations started by this key from operations started from any other cause. In the former case, the apparatus stops at a selected position until the master key is depressed. In the latter case, the apparatus goes through a verifying operation. Associated with the common control equipment at the office, is a relay 127 which, as will appear hereinafter, is energized when a supervisory signal is received in response to an automatic operation at the substation and operates the alarm bell 105 and (green) alarm lamp 104, thus advising the dispatcher that a supervisory signal is being received. Relay 132, also part of the common equipment, is energized following the receipt of a supervisory signal to prepare the final operation circuits for the supervisory lamps.

The supervisory lamps are controlled by the supervisory receiving relay 128 which is energized or de-energized in response to received supervisory signals under control of the supervisory receiving relay 133 which functions as a point selecting relay and associates the common equipment with a particular point. Relay 129 controls the starting of the system into operation, in response to the depressing of control key 110, and furthermore determines the selection code to be sent. It also controls the operation control circuit of control key 110.

Relays 139 to 143 are arranged, as will appear in more detail hereinafter, to function successively as selecting relays to make a point selection; to check the selections made at the remote station; to control the transmission of an operation control code to close or trip the selected breaker and to operate the lamp relay 128. In this same group of selecting relays there is provided a dummy selecting relay 138 which prevents an incorrect selection by reason of a single erroneous impulse being transmitted. Relays 135 to 137 energize in sequence and in series with the relays 138 to 143 to control the successive energization of these latter relays and to prevent simultaneous operation of any two selecting relays during a selecting operation.

Figure 2:
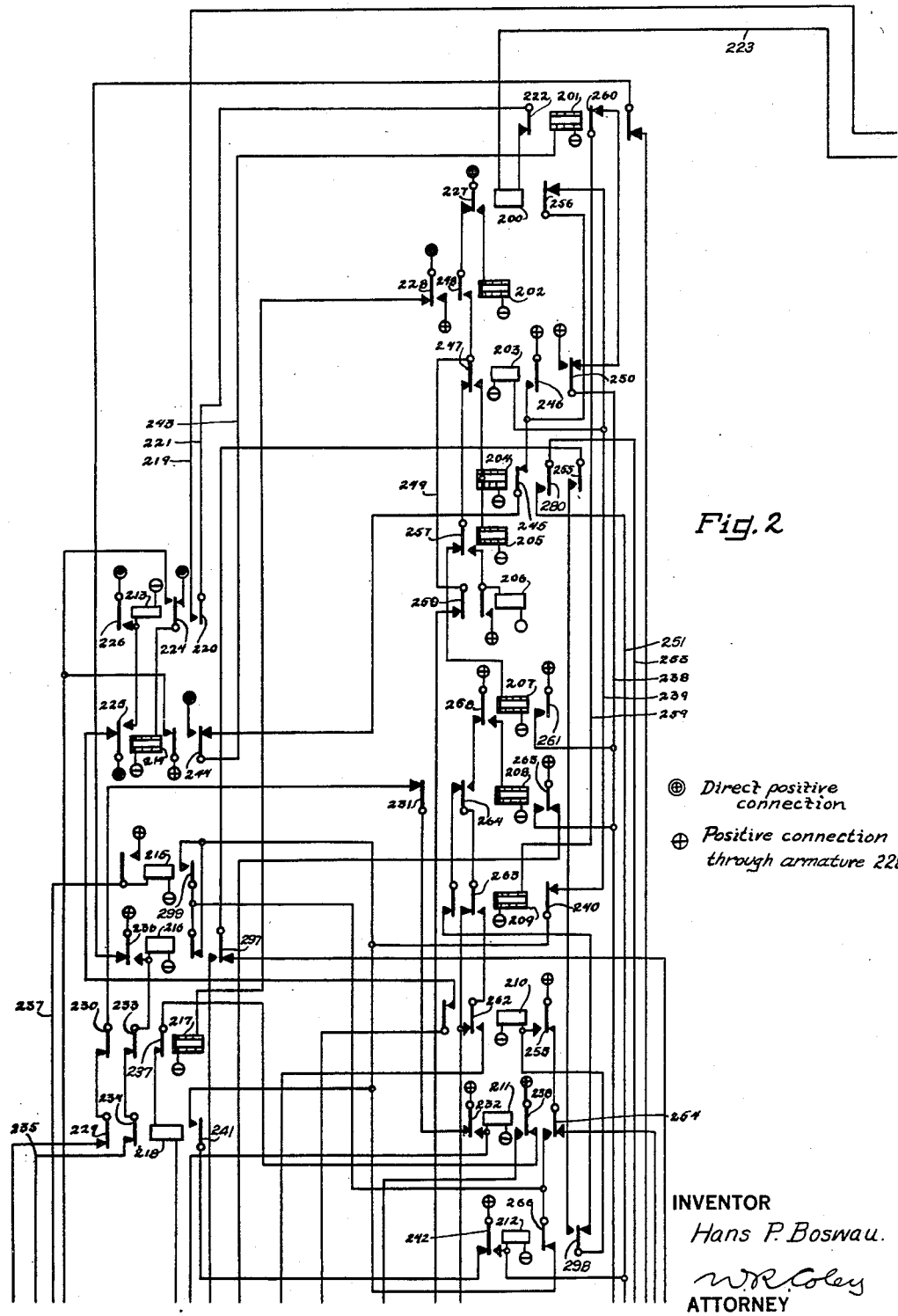
Fig. 2 is a circuit diagram of the common equipment of the office.

In Figure 2, the relay 200 is the line relay which, in this embodiment of my invention, is normally energized over the signalling line. The intermittent energization and de-energization of this relay is controlled by relay 201, the operation of which may be controlled by various means, as will appear hereinafter.

Relay 200 controls the energizing circuit for the slow-to-release relay 202 which, when once energized, remains energized during the intermittent energization and de-energization of relay 200 and will de-energize only if relay 200 remains de-energized for a predetermined period. Relay 202, in this manner, releases the selecting apparatus to restore it to normal at the end of the signalling period.

Relay 203 functions to switch the selecting apparatus from reception to transmission of the selecting impulses. When the sending of the point selecting code is completed, as will appear hereinafter, relay 212 is energized to in turn open the energizing circuit for the relay 203.

Relay 204, during the transmission of impulses, is intermittently energized and de-energized in an interlocking circuit with relay 200 to control the intermittent energization and de-energization of relay 201 as the relay 200 energizes and de-energizes.

When the check code is to be received following a remote selection, relay 207 is energized to in turn energize the relays 208 and 209, to prepare the dispatcher's equipment to receive the check code. At the end of the receipt of the check code, relay 211 energizes in conjunction with the point selecting relay 133 to prepare the circuits for the transmission of the operation control code to operate the selected apparatus unit. With this relay energized, the selecting relays 139 to 143 function to transmit the operation control code.

Relay 218 energizes in response to the depression of a point operate control key to start the apparatus into operation by energizing the sending relay 203. This relay functions in cooperation with relay 216 which is directly controlled by the point control key. Relay 215 is energized under control of the master control key for controlling the transmission of the operation control code.

Relay 214 is energized at the end of a complete cycle of operations to start restoration of the set to normal.

Relay 213 is normally energized and is deenergized only when the battery is interrupted. Thereafter it functions to restore the apparatus at both ends to normal.

The operations for sending a signal to the dispatcher to designate the automatic operation of a device at the remote station are similar to the operations initiated by the dispatcher for such operation, except that in the case of an automatic operation, the operations are initiated electrically through auxiliary contacts on the circuit breaker itself. In such instances, the dispatcher, in addition to receiving a bell signal, notes the change in lamp indication which shows which device on the system is operated. If a certain device is in the closed position, the red lamp associated with that particular device would be illuminated; opening of the device would extinguish the red lamp and light the green lamp and also the guard lamp.

Figure 3:
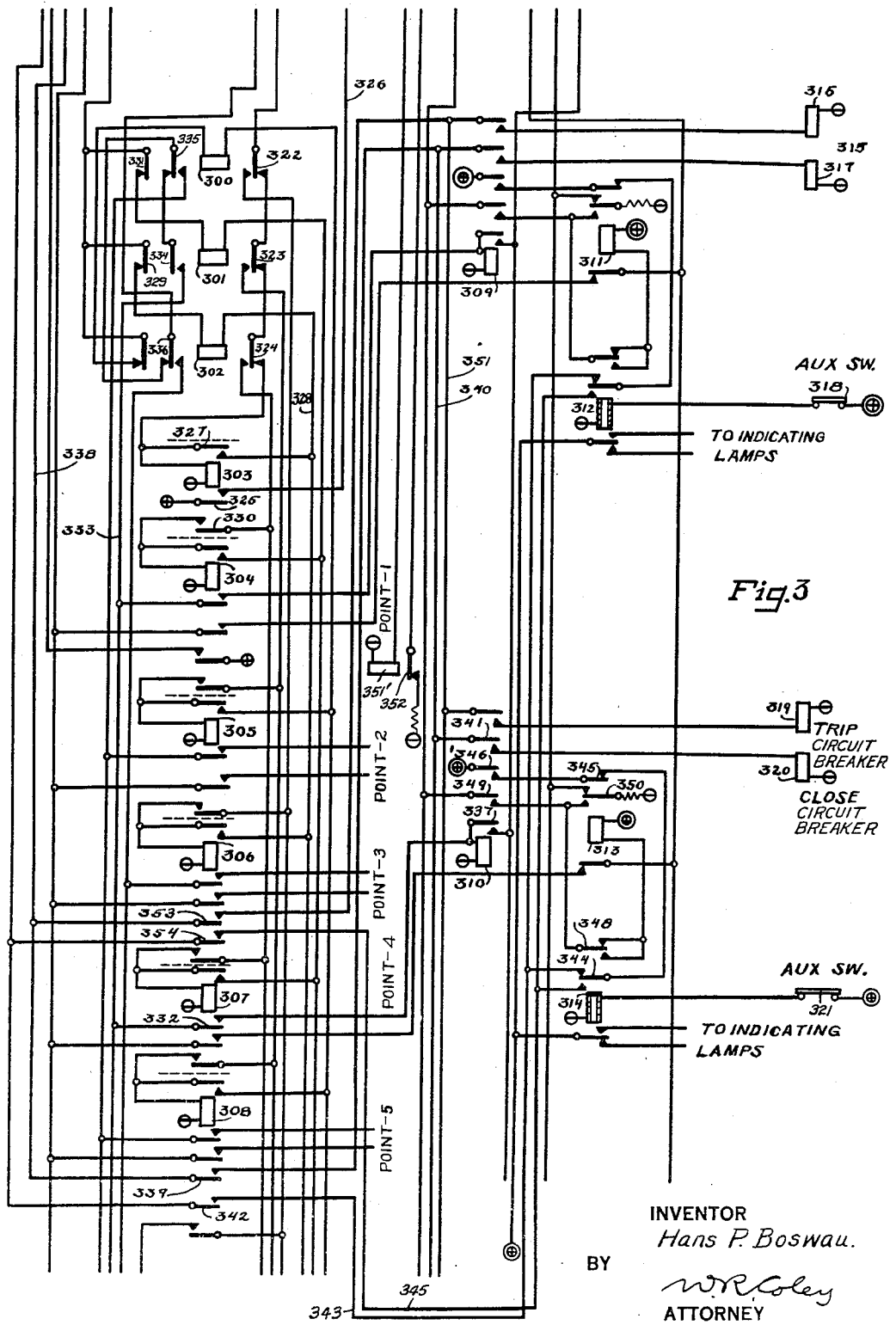
Fig. 3 is a circuit diagram of the individual equipment and selecting relays at the substation.

Examples of the apparatus units to be selectively controlled and supervised from the office are diagrammatically illustrated together with their common equipment in Figure 3. The trip circuit breaker magnet 316 and the closed circuit breaker magnet 317 are provided for a breaker 315. Similarly, a trip magnet 319 and closed magnet 320 are provided for a second individual breaker. Auxiliary switching mechanism associated with each breaker are illustrated at 318 and 321. These control individual slow magnets 312 and 314, respectively, which in turn control the starting of the supervisory operations and the transmission of supervisory signals, in a manner to be described in detail hereinafter, through the operation of their associated relays 311 and 313.

Relays 309 and 310 are the code control operating relays operating in response to a control operation from the office for selectively operating their associated trip circuit breaker magnets and closed circuit breaker magnets.

Relays 303 to 308 are arranged, as will appear in more detail hereinafter, to be energized successively to make a point selection in response to signals received from the office to transmit back to the office a check code indicating the selection made at the office to transmit to the office a code to make a supervisory selection in response to a supervisory operation at the substation and to control the transmission of supervisory signals in response to the operation of the breaker. These relays, as will appear hereinafter, operate in synchronism with relays 138 to 143.

In this same group of selecting relays, there is provided a dummy selecting relay 303 which prevents an incorrect selection by reason of a single erroneous impulse being transmitted. Relays 300 to 302 energize in sequence and in series with relays 303 to 308 to control the successive energization of these latter relays and to prevent simultaneous operation of any two selecting relays during the selecting operation.

Figure 4:
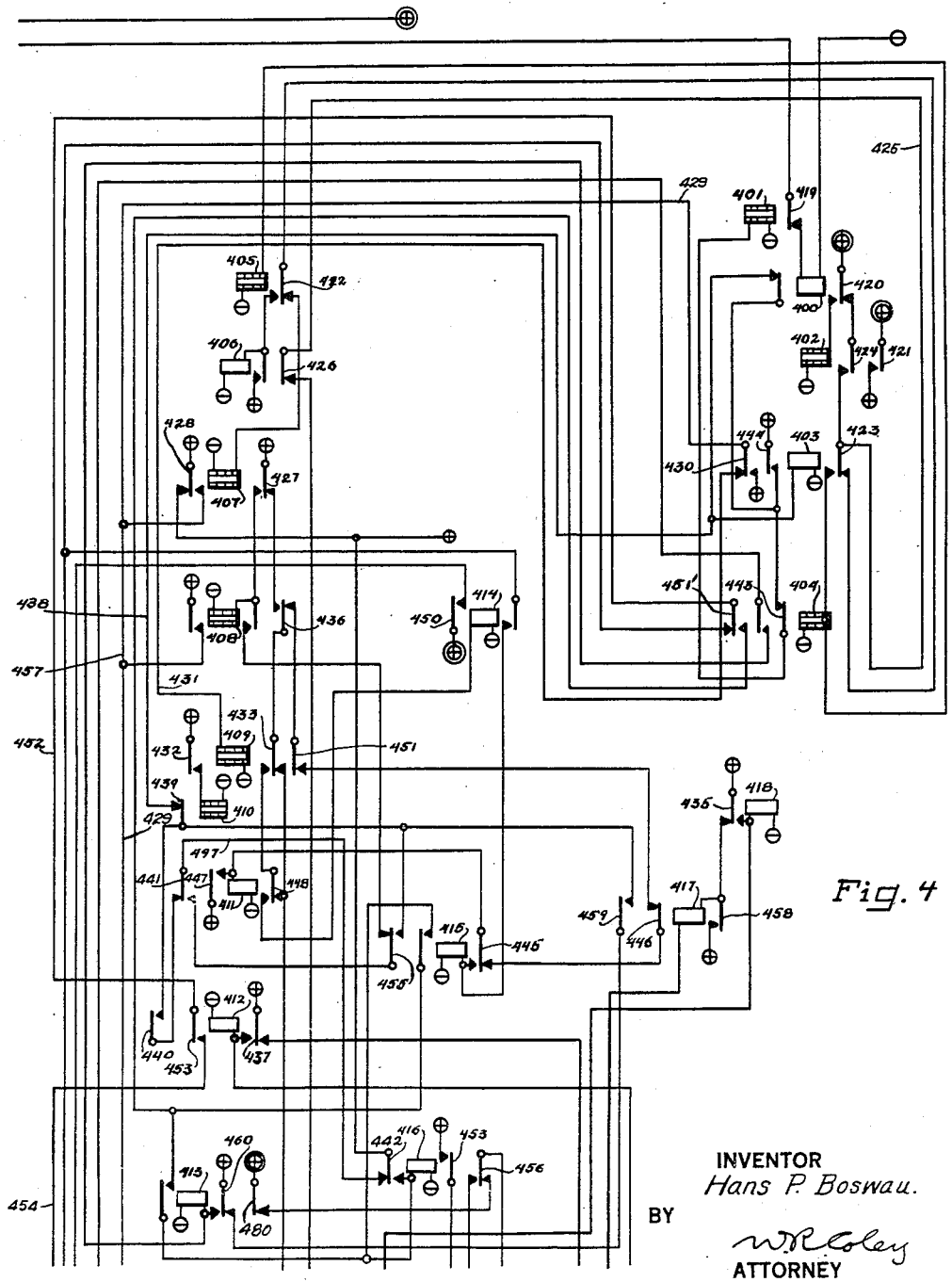
Fig. 4 is a circuit diagram of the common equipment at the substation.

In Figure 4 the relay 400 is the line relay which in this embodiment of my invention is normally energized over the signalling line 223 extending from the office to the substation. The intermittent energization and deenergization of this relay is controlled by the relay 401, the operation of which may be controlled by various means, as will appear hereinafter. Relay 400 controls the energizing circuit for the slow to release relay 402 which once energized remains energized during the intermittent energization and deenergization of relay 400 and will deenergize only if relay 400 remains deenergized for a predetermined period. Relay 402 in this manner releases the selecting apparatus to restore it to normal at the end of a signalling period.

Relay 403 functions to switch the selecting apparatus from reception to transmission of the selecting impulses when the sending of the point selecting code, following a supervisory operation is completed, as will appear hereinafter. Relay 412 controls the energizing circuit for the relay 403.

Relay 404, during the transmission of impulses is intermittently energized and deenergized in an interlocking circuit with the relay 400 to control the intermittent energization and deenergization of relay 401, as the relay 400 energizes and deenergizes. When the check code is to be received following a remote selection, relay 407 is energized to in turn energize relays 408 and 409. At the end of the receipt of the check code, relay 411 is energized in conjunction with the point selection relay to prepare the circuits for the transmission of a supervisory operating code.

Relay 418 energizes in response to the energization of relay 303 following the receipt of the first selecting impulse from the office, and operates in conjunction with relay 416. At armature 435, this relay controls an energizing circuit for the relay 417 which is in turn controlled by the individual equipment of the apparatus units at the substation.

In order to make the invention clear, the following detailed description of operations is given:

Normally, an energizing circuit extends from positive battery at the substation over the line conductor 219 to the front contact, and armature 220 of relay 213, conductor 221, armature 222 and its back contact, to the winding of relay 200, over the line conductor 223 extending to the remote substation, the armature 419 and its back contact, through the winding of the relay 400, to negative battery.

It will be noted, that this energizing circuit depends upon the energization of relay 213 at the office, and this relay is normally energized in the following manner. When the apparatus is first set up into operation and the battery connections are made, the slow-to-de-energize relay 214 is energized over a circuit from negative battery through the winding of the relay 214 and the armature 224 and its back contact, to positive battery.

As a result of the energization of the relay 214 over this circuit, an obvious energizing circuit over the armature 225 of the relay 214 is completed for the relay 213 which, upon energization, locks itself over the front contact and armature 226. Relay 213, thereafter, remains energized until the office battery is lost, as will be explained in more detail hereinafter.

As a result of the energization of the relay 200 over the circuit above traced, an obvious energizing circuit over armature 227 is completed for the relay 202, which, upon energization, opens the energizing circuit for the slow relay 217 at armature 228.

At the substation, as a result of the energization of relay 400, an energizing circuit is completed for the relay 402 at armature 420. Relays 202 and 402 control the reset circuits at armatures 228 and 421, respectively. This will be explained in detail hereinafter.

It will be noted from the foregoing that, with the system in its normal condition, relays 200, 202 and 213 at the office and relays 400 and 402 at the substation are energized. As will appear hereinafter, the individual point relays such as 129 and 131 at the office and relays 311 and 313 at the substation are also normally energized, while the lamp relays such as 128 and 130 at the office and the supervisory relays such as 312 and 314 at the substation may either be energized or de-energized, depending upon the position of their associated circuit breakers.

In order to explain the operations which occur when either the dispatcher desires to close a circuit-breaker or a breaker in the substation is automatically operated, and a signal indicating such operation is to be received at the office; the control and supervisory operations which occur in response to these conditions, will now be described.

It will be assumed that the dispatcher desires to operate the breaker at selecting point 4 to a closed position. To this end the operator will move the control key at 120, which is now shown in the "trip" position, to its alternate "close" position, at which the contacts 121 and 122 engage their inner contacts. The dispatcher will also momentarily operate the point operate key 124.

As a result of the depression of operate key 124, an energizing circuit is completed for the relay 216 from negative battery through the winding of the relay 216 over the armature 233 of relay 217 and its back contact, the armature 234 of relay 218 and its back contact, a conductor 235 to the lower contact 125 of point operate key 124, to positive battery. Relay 216 energizes and locks itself over the front contact and its armature 236.

The relay 131, due to some previous operation, is at this time locked over its armature 144, as will be more clearly set forth hereinafter. When the point operate key 124 is momentarily operated, the winding circuit for the relay 131 is shunted down over a circuit including the conductor 141, contact 126 of point operate key 124, conductor 146, the back contact and armature 229 of relay 218, back contact and armature 230 of relay 217, back contact and armature 231 of relay 208, and back contact and armature 232 of relay 211, to positive battery.

As a result of the de-energization of relay 131, an energizing circuit is completed for the relay 218 from negative battery over armature 144 of relay 131 and its back contact, conductor 147, through the winding of the relay 218, the back contact and armature 237 of relay 217, to the back contact and armature 238 of relay 211, to positive battery. At this time, the point operate key which was just momentarily closed, as indicated above, is released and the contacts opened, as shown.

A result of the energization of relay 218 is to complete an energizing circuit for the relay 203 from negative battery through the winding of the relay 203, conductor 239, over the back contact and armature 240 of relay 209, over the front contact and armature 241 of relay 218, and the back contact and armature 242 of relay 212, to positive battery.

A further result of the energization of relay 218 is to open any possible shunting circuit for point relays such as, relays 129 and 131 at armature 229, so that these point relays can now no longer be de-energized until the completion of all the operations, as will be clearer from the description hereinafter. At armature 234, the original energizing circuit for the relay 216 is also opened, but this relay is now locked over its armature 236 and is accordingly unaffected at this time. The purpose of opening the original energizing circuit of relay 216 is to prevent its energization by accidentally depressing a point operate key such as 124 while the system is functioning to indicate an automatic operation of a circuit breaker.

As a result of the energization of relay 203, an energizing circuit is completed for the relay 201 from negative battery through the winding of relay 201, over conductor 243, armature and back contact 244 of relay 214, armature 245 of relay 204 and its back contact, and the front contact and armature 246 of relay 203, to positive battery.

The energization of relay 201 opens the normal holding circuit for the relays 200 and 400 at the office and substation, respectively, as traced hereinbefore, and these relays are accordingly de-energized.

At the office, the result of the de-energization of relay 200 is to complete an energizing circuit for the relay 204 over the front contact and armature 247 of relay 203, the front contact and armature 248 of relay 202, and the back contact and armature 227 of relay 200, to positive battery; this circuit being completed immediately after the de-energization of relay 200 and before the de-energization of slow relay 202, the circuit of which is momentarily opened.

An energizing circuit is completed for relay 205 in multiple with the circuit traced above for the relay 204.

A third multiple circuit extending from the positive battery at armature 227 of relay 200 is completed over conductor 249, armature 250 of relay 206 and its back contact, armature 148 of relay 135 and its back contact, armature 149 of relay 136 and its back contact, armature 150 of relay 137 and its back contact, through the winding of the relay 138, to negative battery.

Before explaining the further operations at the office, the operations which occur at the substation as a result of the de-energization of relay 400 will now be explained.

As a first result of the de-energization of relay 400, an energizing circuit is completed for the relay 407 from negative battery through the winding of the relay 407, back contact and armature 422 of relay 405, back contact and armature 423 of relay 403, front contact and armature 424 of relay 402, and the back contact and armature 420 of relay 400, to positive battery, this circuit being completed after the de-energization of relay 400 and before the slow relay 402 has time to de-energize and permit its armature 424 to disengage its front contact.

In multiple with this circuit, an energizing circuit extends over the conductor 425, armature 426 and its back contact, armature 322 and its back contact, armature 323 and its back contact, armature 324 and its back contact, and through the winding of the relay 303, to negative battery.

As a result of the energization of the relay 407, as described above, an obvious energizing circuit is completed for the relay 408 over armature 427, and at armature 428, an energizing circuit is completed for the relay 409 from positive battery over the armature 428 and its front contact, conductor 429, armature 430 of relay 403 and its back contact, conductor 431 and through the winding of the slow relay 409, to negative battery.

Slow relay 409 energizes and at its armature 432 completes an energizing circuit for the slow relay 410, for a purpose to be described hereinafter.

As a result of the energization of relay 303 as described above, an energizing circuit is completed over its armature 325, conductor 326, to the relay 418 which upon energization locks itself over its armature 435, and opens the circuit of the substation start relay 417 to prevent the operation of this relay while the dispatcher performs an operation.

It will be recalled that, at the office, the relay 201 was energized to in turn open the energizing circuit of the line relays 200 and 400 when relay 203 was energized. One of the results, however, of the energization of relay 203 was to prepare an energizing circuit for the relay 204 so that, when the line relay 200 was de-energized in the manner described above, relay 204 immediately energized and at its armature 245 opened the energizing circuit traced above for the relay 201.

It will be noted from the above description, that there is here provided a complete cycle of operations for intermittently energizing and de-energizing the line relays 200 and 400. This cycle comprises operations controlled by relays 201 and 204. Energization of relay 201 causes the de-energization of relay 200 which in turn energizes the relay 204 and the relay 204 thereupon de-energizes the relay 201. Relay 201, upon de-energization, in turn recloses the energizing circuit for the relay 200.

Relay 200, upon energization, opens the energizing circuit of relay 204 which, upon de-energization, recloses the energizing circuit of the relay 201 and it, in turn, de-energizes relay 200 to repeat this cycle. In this manner, relays 200 and 400 at the office and substation, respectively, are intermittently energized and de-energized, the number of energizations and de-energizations being controlled in accordance with the selecting point operate key which has been operated.

It will be noted that the relays 201 and 204 are both slow-to-de-energize relays so as to provide sufficient time intervals for the impulses to insure accurate stepping operations. Relay 205, however, which is energized in multiple with relay 204, is considerably slower to de-energize than relay 204, due to a larger amount of copper around its core, and, consequently, it remains energized during the intermittent energizations and de-energizations of relay 204.

As the relays 200 and 400 intermittently energize and de-energize, they operate selecting relays, as will now be described.

It will be recalled, that relay 138 was energized upon the first de-energization of the relay 200. When now the relay 200 energizes again immediately after its first de-energization, an energizing circuit for relay 137, in series with the relay 138, is completed. This circuit extends from negative battery, through the winding of the relay 138, its armature 151 and its front contact, through the winding of the relay 137, back contact and armature 152 of relay 136, conductor 153 and armature 250 of relay 203 and its front contact, to positive battery.

Similarly it will be recalled that at the substation, the relay 303 was energized upon the first deenergization of relay 400 and, when the relay 400 now is again energized, relay 302 is energized in series with the relay 303 over a circuit from negative battery through the winding of the relay 303, its armature 327 and its front contact, conductor 328, through the winding of the relay 302, back contact and armature 329 of relay 301, conductor 429, and front contact and armature 428 of relay 407 to positive battery.

At the office, relay 204 de-energizes and relay 201 thereupon energizes and relays 200 and 400 again deenergize a second time, as explained above. Relay 204 again energizes and the first selecting relay 139 for the first selecting point now energizes over a circuit from negative battery through the winding of the relay 139, front contact and armature 154 of relay 138, front contact and armature 150 of relay 137, back contact and armature 149 of relay 136, back contact and armature 148 of relay 135, back contact and armature 250 of relay 206, conductor 249, front contact and armature 248 of relay 202, and back contact and armature 227 of relay 200, to positive battery.

At the substation, relay 304 now energizes over a circuit from negative battery through the winding of the relay 304, the front contact and armature 330, front contact and armature 324, back contact and armature 323, back contact and armature 322, back contact and armature 426, conductor 425, front contact and armature 424, and back contact and armature 420, to positive battery.

Relays 200 and 400 now energize again and upon the energization of the relay 200, relay 136 energizes in series with relay 139 over a circuit from negative battery through the winding of the relay 139, the armature 156 and its front contact, through the winding of the relay 136, back contact and armature 157, conductor 153, armature 250 and its front contact, to positive battery.

Energization of the relay 136 opens the series energizing circuit for relays 137 and 138, traced above, at armature 152 and these relays accordingly de-energize.

When now relay 400 is energized, relay 301 energizes in series with relay 304 over the back contact and armature 331, and its circuit traced over conductor 429 to the armature 428 of relay 407. Upon the energization of relay 301 the series energizing circuit for the relays 302 and 303 is opened at armature 329 and these relays are accordingly de-energized.

It will be noted from the above description that, upon the de-energization of the line relays 200 and 400, relays 138 and 303 energized simultaneously, and that upon the next energization of relays 200 and 400, relay 137 energized in series with relay 138 and relay 302 energized in series with relay 303. Upon the next de-energization of relay 200, relay 139 was energized over a front contact at armature 154 of the relay 138 while at the substation relay 304 was energized over the front contact and armature 330 of relay 303. Upon the next energization of relays 200 and 400, relay 136 energized in series with relay 139 at the office while relay 301 energized in series with relay 304 at the substation. Energized relays 136 and 301 in turn caused the de-energization of relays 138 and 137 at the office, and relays 303 and 302, respectively, at the substation.

Similarly, upon the next de-energization of line relays 200 and 400, the next selecting point relay 140 at the office and 305 at the substation are energized, and upon the following energization of relays 200 and 400 relay 135 energized in series with relay 140 while relay 300 energized in series with relay 305. Relays 135 and 300 in turn open the energized "point selecting relays" 139 and 136, at the office, and relays 304 and 301, at the substation.

In this manner, as the line relays 200 and 400 are periodically energized and de-energized, the successive "point selecting relays", such as 141 to 143 at the office and 306 to 308 at the substation, are energized and upon each energization of relays 200 and 400 following the energization of these "point selecting relays", these "point selecting relays" in turn energize in series with relays 135 to 137 at the office and 300 to 302 at the substation which in turn de-energize the previously energized "point selecting relays".

It will be noted that only three switching relays, 135 to 137, are provided in the office and only three switching relays, 300 to 302, are provided at the substation, each of these being associated in multiple with individual "point selecting relays". Thus, for example, relay 137 is associated with relays 138 and 141, relay 136 is associated with relays 139 and 142, and relay 135 is associated with relays 140 and 143. Relay 137, when it energizes, opens the energizing circuit for the relay 135 and its associated "point selecting relays" at armature 159; relay 136, when it energizes, opens the energizing circuit for the relay 137 and its associated "point selecting relays"; and relay 135, when it energizes, opens the energizing circuit for the relay 136 and its associated "point selecting relays"; and similar operations occur at the relays 300 to 302 at the substation.

It will be noted that, although only five points are shown on the drawings, additional point selecting relays, such as 139 to 143 and 303 to 308, may be connected to the switching relays 135 to 137 and 300 to 302 to expand the system to any desired number of points.

When the point selecting relay 142 is energized in the manner described, an energizing circuit is completed for relay 212 from negative battery through the winding of the relay 212, over the conductor 251, through the front contact and armature 280 of relay 204, conductor 253, over the armature 160 of relay 142 and its front contact, back contact and armature 161, to conductor 162, back contact and armature 254 of relay 211 and the back contact and armature 255, to positive battery.

It will be noted that the circuit for the relay 212, although successively prepared at each point selecting relay, is held open by the individual selecting point relays, such as 129, which are normally energized. Relay 131, however, having been de-energized, completes an energizing circuit for relay 212 in the manner described. This operation, it will be noted, occurs during the period in the cycle of operations while the relay 204 is energized to complete the above described circuit for relay 212.

Relay 201 now de-energizes in the course of the normal cycle of operations and relay 200 energizes, while the energizing circuit for the relay 203, which had been previously traced over the back contact and armature 242, is opened. Relay 203, it will be noted, was locked immediately after its energization over the back contact and armature 256, front contact and armature 246 to positive battery. However, upon the energization of relay 212 and the subsequent energization of the line relay 200, the energizing and locking circuits for relay 203 are both opened and this relay de-energizes. This prevents a switching to the receiving condition at the office until the last impulse is completed. Relay 203, when de-energized, prevents further operation of relay 201, thereby stopping the sending of impulses.

Simultaneously, as a further result of the energization of relay 200, the relay 136 energizes in series with relay 142, as described above, and relay 136, upon energization, opens the series energizing circuit of the previously energized relays 141 and 137 at armature 152. Relays 142 and 136, however, do not remain energized as their energizing circuit is opened at the armature 250 when relay 203 de-energizes, as described above.

As described hereinbefore, a further result of the energization of relay 200 is to de-energize the slow relay 204 and subsequently the relay 205.

While these operations have been going on at the office, similar point selecting relays have been energized at the substation so that, at this time, relay 301 is energized in series with relay 307. Relay 301, upon energizing, opens the energizing circuit of the previously energized point selecting relay 306 and series energized relay 302.

It will be noted that relay 407 is a slow-to-release relay and accordingly is unaffected during the short impulse intervals while its circuit is periodically opened and closed by relay 400. However, when its energizing circuit is held open sufficiently long, relay 407 de-energizes upon the energization of relay 400 and an energizing circuit is accordingly completed for the relay 310 associated with the circuit breaker which is to be operated. This circuit extends from negative battery through the winding of the relay 310, over the front contact and armature 332, conductor 333, over the front contact and armature 334, back contact and armature 335, back contact and armature 336, back contact and armature 448, over the front contact and armature 433, and the armature 436 and its front contact and the back contact and armature 427, to positive battery.

Upon energization of the relay 310, an energizing circuit is completed for the relay 412 from negative battery, through the winding of the relay 412, over the front contact and armature 337, to positive battery, over the circuit traced for relay 310. Relay 412, upon energization, locks itself and relay 310 over its front contact and armature 437. A further result of energization of relay 310 is to shunt down relay 313, which is normally energized, for the purpose to be described hereinafter. This shunt includes front contact and armature 349, armature 456 and its back contact and back contact and armature 480 of relay 413.

An interval of time after the de-energization of relay 407, the slow-to-de-energize relay 408 de-energizes. De-energization of relay 408 opens the holding circuit for relay 307 and 301 and also opens the energizing circuit for relay 409.

After an interval of time, slow to release relay 409 is de-energized and it, in turn, de-energizes relay 410. An energizing circuit is now completed immediately following the de-energization of the relay 410 for the relay 403 from negative battery through the winding of the relay 403, over the conductor 438, back contact and armature 439 of relay 410, front contact and armature 440 of relay 412, now energized, back contact and armature 441, and back contact and armature 442, to positive battery.

Relay 401 at the substation is now energized over a circuit from negative battery through the winding of the relay 401, over the armature 443 and its back contact, and front contact and armature 444, to positive battery.

It will be noted, at this time, that, although heretofore the impulsing for the code impulses was controlled from the office by means of relay 201 until the selection was completed, the succeeding checking impulses will now be controlled by the relay 401 at the substation.

Relay 401, upon energization, opens the main drive line at armature 419, thereby de-energizing the two line relays 200 and 400 at the office and substation, respectively.

At the substation, as a result of the de-energization of relay 400, an energizing circuit is completed for the relay 404 over the front contact and armature 423, and front contact and armature 424, and the back contact and armature 420.

A multiple energizing circuit is completed for the relays 405 and 303, the circuit for the latter extending from negative battery, winding of relay 303 over the back contacts and armatures 324, 323, 322, 426, front contact and armature 424, back contact and armature 420 to positive battery.

At the office, upon de-energization of relay 200, inasmuch as relay 203 is now de-energized, an energizing circuit is completed for the relay 207 from negative battery through the winding of the relay 207, back contact and armature 257, back contact and armature 247, front contact and armature 248, back contact and armature 227, to positive battery. A multiple energizing circuit is also completed for the relay 138, as traced hereinbefore.

Attention is directed at this time to the difference in operation of the two stations during the checking period as distinguished from the previous selecting period. Whereas, previously, the relay 203 at the office was energized and accordingly controlled the energizing circuits for relays 204 and 205 at armature 247 and the energizing circuit for the point selecting relays at armature 250 during the checking period, relay 203 now remains de-energized.

At the substation, the relay 403, which has de-energized during the selecting period, is now energized. The effects of this difference will be noted in the description which follows.

As a result of the energization of relay 207 at the office, an obvious energizing circuit is completed for the relay 208 over the front contact and armature 268. Relay 209 is also energized at this time over a circuit from negative battery through the winding of relay 209, over conductor 259, armature 260 and its back contact, back contact and armature 250, and the front contact and armature 261, to positive battery.

At the substation, as a result of the energization of relay 404 the energizing circuit for relay 401 is opened and this relay de-energizes again, closing the drive line and energizing relays 200 and 400.

Energization of relay 400 at the substation provides a series energizing circuit for relays 302 and 303 in series, as traced above, and at the office, the energization of relay 200 provides a series energizing circuit for the relays 137 and 139, as traced hereinbefore.

At the substation, as a result of the energization of relay 400, the energizing circuit for the relay 404 is again opened and this slow-relay again de-energizes. As a result of the de-energization of relay 404, relay 401 is again energized, opening the drive line and de-energizing relays 200 and 400.

De-energization of relay 200 at the office energizes the relay 139 as described above, and at the substation, the de-energization of relay 400 energizes relays 404 and 304, as described hereinbefore.

The cycle of operations, as described above, is now repeated; relay 401 periodically energizing and de-energizing the relays 400 and 404 to control the transmission of impulses for intermittently energizing and de-energizing relays 200 and 400. As these relays energize and de-energize, they successively energize the point selecting relays 138 to 143 at the office, and 303 to 308 at the substation, while the relays 135 to 137 and 300 to 302 energize in succession, each in turn controlling the de-energization of the preceding switching relay and its associated point selecting relay.

When the point selecting relay 307 is energized and relay 301 is energized in series therewith, an energizing circuit is completed for the relay 411 from negative battery through the winding of the relay 411, over armature 445 and its back contact, armature 446 and its back contact, back contact and armature 451, back contact and armature 436, armature 433 and its back contact, armature 336 and its back contact, armature 335 and its back contact, armature 334 and its front contact, conductor 333, armature 332 and its front contact, armature 337 and its front contact, and front contact and armature 437, to positive battery. Relay 411, upon energization, locks itself over its front contact and armature 447.

Relay 403, which has been provided with two energizing circuits; one, its own locking circuit over armature 444, and the other, over armature 441 of relay 411, is now de-energized due to the fact that both of these circuits are now opened. As a result of the de-energization of relay 403, relays 307 and 301 are de-energized.

During the transmission of the checking impulses, relay 207 has remained operated in the manner described for relay 401 at the substation. Relay 200 now remains energized at this time for a longer interval than the normal impulsing interval due to the de-energization of relay 403 which stops the cycle of operations of relays 401 and 404 and, as a result, relay 207 de-energizes after an interval of time. An energizing circuit is thereupon completed for the relay 134 from negative battery through the winding of relay 134, front contact and armature 163, conductor 164, front contact and armature 165, back contact and armature 166, back contact and armature 167, back contact and armature 262, front contact and armature 263, armature 264 and its front contact, back contact and armature 268, to positive battery.

An energizing circuit is thereby completed for relay 211 from negative battery through the winding of relay 211 and over the front contact and armature 168, to positive battery, over the circuit traced above for relay 134.

The office has thus completed a selection of a circuit breaker to be operated, and the sub-station, following this selection, has checked the selection.

The check lamp 117 at point 4 is now illuminated by an energizing circuit over armature 169 and its front contact, indicating that the selection has been made and checked and that the apparatus is in condition for operation.

Slow-to-de-energize relay 208 de-energizes a short interval of time after the relay 207 has de-energized. The relay 218 is also de-energized at this time as a result of the energization of relay 211. Relays 142 and 136 are de-energized following the de-energization of relay 208.

As a further result of the de-energization of both slow relays 207 and 208, slow relay 209 de-energizes after an interval of time, inasmuch as its energizing circuit is completed over the front contacts of either armature 261 or armature 265.

With the twist control key 120 in the position for closing the breaker, the dispatcher may now, by operating the master control key 102, cause an operation of the selected unit in the following manner.

The operator will depress the master control key 102, closing the contact 101. An energizing circuit is thereupon completed for the relay 215 from negative battery through the winding of the relay 215, contact 101, over the front contact and armature 232 to positive battery. Relay 203 is now energized a second time over a circuit from negative battery through the winding of the relay 203, conductor 239, back contact and armature 240, front contact and armature 299, front contact and armature 254 of relay 211 which was just described as energized, and back contact and armature 255, to positive battery.

As a result of the energization of relay 203, an energizing circuit is completed for relay 201 from negative battery through the winding of relay 201, conductor 243, armature 244 and its back contact, armature 245 and its back contact, and front contact and armature 246, to positive battery.

Energization of relay 201 de-energizes relays 200 and 400 in the manner already described, and as a result of the de-energization of relay 200 and before the de-energization of slow relay 202, relays 204, 205, and 138, are energized; all in the manner which was described in detail hereinbefore.

At the substation, the de-energization of relay 400, simultaneously with the de-energization of relay 200, completes an energizing circuit for the relays 407 and 303, in the manner described hereinbefore.

Energization of the relay 407 completes an obvious energizing circuit for relay 408 which in turn completes an energizing circuit for relay 409, as described hereinbefore. Relay 409, upon energization, in turn completes an obvious energizing circuit for relay 410.

At the office, the energization of relay 204 opened the energizing circuit for the slow relay 201 which in turn completes the energizing circuit for the series line relays 200 and 400. Energization of the relay 200 completes an energizing circuit for the relays 138 and 137 in series, while at the substation, the energization of relay 400 completes an energizing circuit for the relays 303 and 302.

At the office, relay 200 first energizes and in turn de-energizes the relay 204, all as described before, and the relay 201 is again energized to de-energize relays 200 and 400.

This cycle continues, to successively energize the selecting relays for a third cycle and in this manner, ultimately, relay 135 is energized in series with the relay 143 at the office, while simultaneously the relay 300 is energized in series with the relay 308 at the substation.

At the office, the energization of relay 135 opens the series energizing circuit for the relays 142 and 136 at the armature 157. Relay 143 upon energization completes an energizing circuit for relay 210 from negative battery through winding of relay 210, armature 298 and its front contact, front contact and armature 255, armature 297 and its front contact, armature 199 and its front contact, conductor 178, inner contact and spring 122, back contact and armature 198, front contact and armature 177 to positive battery. Relay 210 locks up and, in turn, de-energizes relay 203 at its armature 255. Relay 203 upon de-energization stops further impulsing from the office. The cycle of operation now stops at this point with the relays 200 and 400 energized as described in connection with the previous cycles.

A further result of the de-energization of relay 203 is the opening of the series energizing circuit for the relays 143 and 135.

At the substation, the energization of relays 308 and 300 opens the series energizing circuit for the relays 307 and 301. An interval after the continued energization of relay 400, slow-to-release relay 407 is de-energized and an energizing circuit is closed for the relay 414 from negative battery through the winding of the relay 414, front contact and armature 448, front contact and armature 433, armature 436 and its front contact, and back contact and armature 427, to positive battery.

Energization of relay 414 completes an energizing circuit for the closing breaker magnet 320 from positive battery over armature 450 and its front contact, conductor 338, armature 339 and its front contact of selecting relay 308, conductor 340, armature 341 and its front contact, through the winding of the closing magnet 320, to negative battery, and the circuit breaker closes.

As a result of the movement of the circuit breaker from its tripped to its closed position, the auxiliary switch 321, which is a part of the breaker, opens the circuit for the slow-to-release relay 314 which then de-energizes. An energizing circuit is thereupon completed for the relay 415 from negative battery through the winding of relay 415, front contact and armature of relay 414, back contact and armature 451 of relay 404, conductor 452, armature 453 and its front contact, conductor 454, through the armature 342 and its front contact, conductor 343, back contact and armature 344, back contact and armature 345, and front contact and armature 346, to positive battery.

Relay 408 is at this time locked over a circuit from negative battery through the winding 408, its own armature and front contact, back contact and armature 455, front contact and armature 441, back contact and armature 442 to positive battery. It will be noted that this locking circuit includes the armature contacts 455 of relay 415 which in turn is controlled by the circuit breaker. Relay 408 therefore, maintains the closing circuit of the breaker through magnet 320 closed until the breaker is latched in its closed position. As soon, however, as the circuit breaker closes and latches in position, relay 415 is energized as described above and the locking circuit for relay 408 is opened.

Relay 408 now de-energizes, due to the fact that relay 407 was previously de-energized, and in turn opens the energizing circuit for the relay 414 at armature 436. De-energization of relay 408 also causes the de-energization of slow relay 409 which in turn opens the energizing circuit for the relay 410 at armature 432. A further result of the de-energization of relay 408 is to de-energize relays 308 and 300.

Relay 403 is now energized over a circuit from negative battery through the winding of relay 403, over conductor 438, back contact and armature 439, front contact and armature 455, front contact and armature 441, back contact and armature 442, to positive battery.

Energization of relay 403 completes an energizing circuit for relay 401, in the manner described hereinbefore, which in turn opens the energizing circuit for the line relays 200 and 400. De-energization of relay 400 at the substation completes energizing circuits for relays 404, 405, and 303, in the manner which has already been described in detail.

At the office, the de-energization of relay 200 energizes relays 207 and 138 in the manner already described. Energization of relay 207 in turn energizes relays 208 and 209, as hereinbefore described.

At the sub-station, the energization of relay 404 de-energizes relay 401 which thereupon, at armature 419, again closes an energizing circuit for relays 200 and 400 in series. Now relays 200 and 400 energize successively in the manner described hereinbefore.

The selecting relays 139 to 143 are successively energized and in synchronism with the selecting relays 304 to 308 at the substation.

As a result of the energization of relays 308 and 404, an energizing circuit is now completed for the relay 416 from negative battery through the winding of relay 416, armature and front contact of relay 413, front contact and armature 451', conductor 452, armature 453 and its front contact, conductor 454, armature 342 and its front contact, conductor 343, back contact and armature 344, back contact and armature 345, front contact and armature 346 to positive battery.

Relay 313 is now energized over a circuit from positive battery through the winding of relay 313, back contact and armature 348, front contact and armature 349, armature 456, and its front contact and armature 352 and its back contact, to negative battery.

Relay 313, upon energization, locks itself over the front contact and its armature 350. A further result of the energization of relay 416 is to complete an energizing circuit for the relay 351' from negative battery through the winding of the relay 351 and armature 453 and its front contact to positive battery. Relay 351' opens the above traced energizing circuit for relay 313 at armature 352 to prevent the holding of a prolonged operating circuit for relay 313. Relay 313 is the supervisory relay which must de-energize when the breaker changes. Accordingly, if the breaker change occurred at the time when the energizing circuit is closed, the supervisory relay would not release if the operating current for relay 313 were maintained during and after the interval while armature 348 moved between its contacts.

At this time, relay 401 de-energizes and relays 200 and 400 are energized in series.

At the substation, relay 403 de-energizes by reason of the operation of relay 416 which has been energized. Relays 300 and 308 are energized in series. This energization of relay 300 opens the series energizing circuit for relays 307 and 301. Relays 300, 308, and 404 now de-energize.

At the office, the relays 135 and 143 energize in series to open the series energizing circuit for relays 136 and 142. Relay 207 now de-energizes and an energizing circuit is completed for the relay 132 from negative battery through the winding of relay 132, front contact and armature 262, front contact and armature 263, armature 264 and its front contact, and the back contact and armature 268, to positive battery.

Energization of the relay 132 completes an energizing circuit for the relay 130 from positive battery through the winding of relay 130, front contact and armature 170, front contact and armature 171, and front contact and armature 172, of selecting relay 143, to negative battery. Relay 130 locks itself over an obvious circuit.

A circuit is also completed for the relay 131 from positive battery through the winding of relay 131, front contact and armature 173, armature 174 and its front contact, to negative battery.

As a result of the energization of relay 130, the red lamp 119 is illuminated over an energizing circuit including armature 175 and its front contact, indicating to the dispatcher that the circuit breaker has closed in accordance with the control operation performed by the dispatcher. At the same time, the energizing circuit for the green lamp 123, which has been illuminated up to this time to indicate that the circuit breaker is in the tripped position, is opened, and the lamp is extinguished, providing a further indication to the dispatcher of the breaker condition.

An interval of time after the de-energization of relay 207, slow-to-release relay 208 de-energizes, releasing the relays 143 and 135, as described hereinbefore. An energizing circuit is now completed for the relay 214 from negative battery through the winding of relay 214, armature 224 and its front contact, armature 176 and its front contact, and the back contact and armature 265, to positive battery. Relay 214 locks up.

As a result of the energization of relay 214, an energizing circuit is completed for the relay 201 over the front contact and armature 244. As a result of the de-energization of relay 208, the energizing circuit for the relay 132 is opened and this relay de-energizes after an interval of time.

Energization of relay 201 opens the energizing circuit for the two line relays 200 and 400, which thereupon de-energize. Relay 209 de-energizes an interval of time after the de-energization of relay 208. An interval after the de-energization of relay 200, relay 202 de-energizes, and as a result, relays 216, 210, 134, 211, 215 and 212, are all de-energized. In this connection, attention is directed to the symbols employed for positive battery. The symbol with a double circle indicates a direct connection to battery. The symbol with a single circle indicates connections to battery through front contact and armature 228 of relay 202. Therefore, until relay 202 drops out all circuits showing a positive battery connection with a single circle remain connected to the positive battery. The purpose of this connection is to release the system whenever relay 202 is de-energized. At the substation, the de-energization of relay 400 de-energizes relay 402, and relays 416, 415, 411, 412, 351, 418, and 406 are de-energized.

At the office, relay 214 de-energizes, following the de-energization of relay 202, and in turn de-energizes relay 201. De-energization of relay 201 again closes the normal energizing circuit for the line relays 200 and 400. Relay 200 in turn energizes relay 202 and relay 400 energizes relay 402.

The apparatus is now back in its normal condition which existed before the dispatcher operated his individual control key to start operations and is now ready for further operations. In the manner described in detail in the above, the dispatcher may selectively operate any other breaker either to its closed or trip position.

A trip operation is performed in a manner similar to the closing operation, except that the twist key is placed in the trip position. It will be noted, that the spring 122 of the control key 120, when it engages its upper contact which is the circuit breaker closing position extends battery from the front contact and armature 177 of relay 134, over conductor 178, front contact and armature 199 of relay 143 for operating the relay 210, to stop the transmission of operation control impulses.

Accordingly, five such impulses are transmitted for closing the breaker. If, however, the trip control key is in its lower position and the spring 122 engages its lower contact, battery from the same source extends over the conductor 179 only to the armature contact 198a of relay 141, so that only three impulses are transmitted for a trip operation.

At the substation, the circuit for the closing magnet 320 is completed over conductor 340 and the armature 339 of the fifth selecting relay 308, so that if five operation control impulses are received, the closing magnet is energized. The trip magnet 319, it will be noted, is connected over conductor 351, to the armature 353 of the third selecting relay 306 so that, if three impulses are received, a trip operation will result.

Similarly, when the breaker at the substation is in its closed position, the auxiliary switch opens the contacts to the relay 314 and energy from the positive battery at armature 346 extends over armature 344 and its back contact, conductor 343 and armature 342 to the relay 416, so that five impulses are transmitted to indicate a closed condition of the breaker. If, on the other hand, the breaker is in its tripped position, the auxiliary switch 321 closes the circuit to relay 314 which thereupon extends circuit from the positive battery at armature 346 to the armature 354 of relay 306 and three impulses are transmitted to indicate a tripped condition of the breaker.

At the office, it will be noted that the relay 130 is energized over the energizing circuit including armature 172 of the fifth relay 143 so that when five impulses are received, relay 130 energizes to, in turn, complete an energizing circuit for the red lamp 119 which indicates a closed condition of the breaker. Similarly the locking circuit for the relay 130 is shunted down at the armature 180 of relay 141 when three impulses are received in accordance with a tripped condition of the breaker.

De-energization of the relay 130 completes an energizing circuit for the lamp 123 which indicates a tripped condition of the breaker.

In the event that a breaker at the substation trips automatically, the apparatus is automatically started into operation to select the associated signalling lamp at the office and to operate it in a manner described above in connection with the supervisory operations. In order to make this clear, the manner in which the set is started into operation in response to an automatic operation will now be given.

It will be assumed, for example, that an automatic operation takes place at the substation such as the tripping of the breaker on the fourth selecting position, the tripping being due possibly to the action of a protective overload device. The substation thereupon sets the apparatus into operation to send signals to select the proper indicating lamps and to change these lamps to agree with the new position of the breaker in the following manner.

Upon the tripping of the circuit breaker, the circuit for relay 314 is energized. As the armature 348 moves from its back to its front contact, the locking circuit for the relay 313 is momentarily opened sufficiently long to permit relay 313 to de-energize and to open its own locking circuit at front contact and armature 350. An energizing circuit is thereupon completed for the relay 417 from positive battery over armature 435 and its back contact, through the winding of the relay 417, and the back contact and armature 350, to negative battery.

Relay 417 energizes and locks itself over its armature 458, and at armature 459 completes an energizing circuit for the relay 403 from negative battery, through the winding of the relay 403, over conductor 438, back contact and armature 439, front contact and armature 459, and the back contact and armature 460, to positive battery.

Energization of the relay 403 completes an energizing circuit for the relay 401, in the manner described above, and relays 200 and 400 are de-energized. The apparatus is thus started into operation and successive impulses are transmitted, in the manner described above, to transmit five successive selecting impulses. At the office, a selection is made in accordance with this operation which in turn is checked back to the substation from the office. If the two agree, as in the case of the previous check, the substation sends a train of impulses to change the lamp indication and to reset the equipment to normal rest position.

In view of the fact that, in the case of an automatic operation, the apparatus is started into operation from the substation end and in the case of control operations, operations are started at the dispatcher's office, there are some changes in the controlling relays which are energized when an automatic operation takes place over the controlling relays energized when the operations are initiated by the dispatcher. It will be recalled that, when the dispatcher initiates operations, the relay 218 is energized. Relay 218 thereupon controls the starting of the selecting code combination of impulses. Subsequently, relay 212 is energized to stop further transmission of selecting code combination of impulses.

At the substation in response to the receipt of the selecting code combination of impulses, the point selecting relay 310 is energized and relay 412 energizes to initiate the transmission of a checking code combination of impulse conditions. Following the complete transmission of this checking code combination, relay 411 is energized to stop the transmission of this code, or in other words, to determine the last impulse of this code combination.

This checking code combination of impulse conditions selects the point selecting relay 134 at the office for energization. Relay 211 energizes to prepare the sending of an operation control code combination of impulses to the substation and relay 210 energizes to stop further transmission of this code or, in other words, to determine the last impulse of this code.

In response to this control code combination of impulses, the previously selected breaker is operated and in turn operates relay 415. The energization of this relay initiates the sending of a supervisory code combination of impulses to indicate the new position of the breaker and relay 416 energizes to stop the supervisory code combination of impulses at the last impulse.

On the other hand, when an automatic operation takes place at the substation and the functioning of the system is initiated from the substation, relay 417 is energized as hereinbefore described and initiates the sending of a selection code combination of impulses. The reception of this selection code combination of impulses at the office selects the operation of the point selecting relay 134. Relay 211 energizes to initiate the sending of a checking code combination of impulses and relay 210 energizes to terminate the checking code combination of impulses.

The reception of this checking code combination of impulses at the substation selects operation of the point selection relay 310. Thereupon relay 412 energizes to initiate the sending of a supervisory code combination of impulses to indicate the new position of the circuit breaker and relay 416 energizes to stop the sending of the supervisory code combination of impulses or, in other words, to determine the last impulse of this code.

The release of the apparatus to its normal condition is identical in both cases.

It should be noted, that when the substation sends a supervisory signal to record an automatic operation, the alarm relay 127 is energized due to relay 216 being deenergized at the time so that a circuit is closed for relay 127 when relay 138 operates on the first or dummy impulse, which in turn, locks itself over armature 181 and, at armature 182, closes the circuit for the alarm lamp 104, and at armature 183, closes the circuit for the alarm bell 105, thus advising the dispatcher that a supervisory signal has been received.

It is possible that the equipment may jam at any selecting position due to line troubles or other reasons. In that case, it is desirable to be able to reset the apparatus in order that a second opportunity for operation may be provided.

This is accomplished by pressing the "release key" 103. Operation of the release key 103 to move its spring for the upper position completes an energizing circuit for the relay 214 from positive battery over upper contact of key 103, front contact and armature 224 of relay 213 which is energized at this time, relay 214 to negative battery. Relay 214 closes a locking circuit for itself.

Energization of the relay 214 completes an obvious energizing circuit for the relay 201, which in turn opens the circuit for the line relays 200 and 400.

De-energization of line relays 200 and 400 opens the energizing circuits for the slow releasing relays 202 and 402, respectively. After an interval of time, these relays de-energize, opening the master positive and de-energizing all the relays which may at that time be operated from this position.

At the office, relay 214 de-energizes, in turn de-energizing relay 201, and relays 200 and 400 will again energize over the normal holding circuit, as described heretofore, thereby causing relays 202 and 402 to energize. All the apparatus is now back to normal rest position again, in preparation for further operations.

In the event that the checking impulses, in the case of a control operation initiated by the dispatcher, do not agree with the individual unit to be operated by the dispatcher, provision is made in accordance with my invention for automatically restoring the apparatus to normal in order that the selecting operation may be repeated and to visually indicate to the dispatcher that the checking code does not agree with the position of the individual unit to be controlled.

It will be assumed, that the checking code does not agree with the selection desired and therefore does not operate the point selection relay 142, but instead, for example, operates relay 141 or for that matter any other of the point selecting relays.

It will be recalled that when relay 142 was selected, an energizing circuit was completed for relay 134 which in turn completed at its armature 177 an energizing circuit over the back contact of the armature of relay 131 to the relay 210 and relay 210 in turn stopped the transmission of further operation control code impulses.

In the event, however, that this point selecting relay 134 is not energized due to the fact that checking code does not agree with the key operated, then the above circuit for relay 210 is not completed since any other point selection relay such as 129 will not have been dropped out by the individual control key.

If, therefore, the dispatcher fails to note by observing the checking lamp 117 that the checking code does not agree with the individual key operated and proceeds to depress the master control key 102, the operation control code will be transmitted but will not stop at the end of the fifth impulse in view of the fact that relay 210 is not energized. Accordingly, sufficient impulses will be transmitted to energize all of the relays in the group 138 to 143 at the office and 303 to 308 at the substation.

When the last one of these relays (relay 143 in the present illustration) is energized, and a further impulse is transmitted, the release relay 214 is energized over a circuit from negative battery through the winding relay 214, armature 224 and its front contact, armature 176 and its back contact through the front contact and armature 197, front contact and armature 148, back contact and armature 250, front contact and armature 248, and back contact and armature 247 to positive battery. Relay 214 is energized over this circuit and operates to restore the apparatus to normal in the manner which has already been described in detail hereinbefore.

In the event that the checking code combination from office to substation, which follows the initiation of operations by an automatic operation of a breaker, indicates that the selection made at the office does not agree with the breaker which has operated at the substation, an automatic release of the apparatus to normal condition is also obtained and the apparatus is again initiated into operation for indicating such supervisory operation.

It will be recalled that, in the supervisory operations described hereinbefore in connection with the automatic operation of relay 313 associated with a breaker, relay 310 was energized in response to the checking code received from the office to indicate the supervisory selection made thereat. If, however, any other point selecting relay than 310, as for example, 309 is energized, indicating that a different supervisory selection was made at the office than that of the operated breaker, the circuit for relay 416, traced hereinbefore, and which upon energization, controls the stopping of the supervisory code combination of impulse conditions is not completed.

Accordingly, when the supervisory code combination of impulses is transmitted, the impulses are not stopped at either the third or fifth impulse as in the case of tripping or closing, respectively, but will continue until all of the relays of the chain 303 to 308 at the substation and 138 to 143 at the office are energized.

When the last of these relays are energized and a further impulse is received at the office, an energizing circuit is completed for the relay 214 over the circuit described in detail hereinbefore. Relay 214 is energized and restores the apparatus to normal.

However, relay 313 is still de-energized, since its circuit was held open at the front contact of armature 456 of relay 416 which did not energize. Accordingly, the apparatus is again started into operation in the manner described hereinbefore and a supervisory point selecting code combination of impulses is transmitted from the substation to the office and again a checking code is received at the substation. If this checking code agrees with the circuit breaker operation, normal operations as described hereinbefore will occur.

The battery at the office may momentarily be lost. This may occur in a number of conditions, as for example, when the apparatus is in operation for remotely controlling a circuit breaker by supervisory signals or it may happen, while the apparatus is in its normal position of rest. In the former case, either a wrong selection might be made after a momentary loss of battery or an inaccurate supervisory signal might be received. In the latter case, the relays at the office which may be energized, as for example, the individual relay 128 or 130 and which, when energized, indicates the closed position of the system breakers, will lose their energizing circuit and accordingly, indicate a false position of the remote individual breakers.

To correct this, I provide in my system automatic means, operative in the event that the battery is lost, for instantaneously restoring the apparatus to normal and to automatically check the actual condition of all of the circuit breakers.

It will be assumed, that battery is momentarily lost at the office. It will be recalled, that relay 213 was described as energized when the apparatus was first put into operation and locked at its armature 226. Relay 213 thereafter remains energized during all conditions except when the battery is momentarily lost in which event relay 213 at once de-energizes. Upon de-energization of relay 213 in response to a momentary loss of battery, a circuit is prepared for relay 213 by armature 224. As soon as the battery returns, relay 214 is energized, and at its armature 225 completes an energizing circuit again for the relay 213. Relay 213 energizes and its armature 226 again locks itself. At its armature 224, it completes a locking circuit for the relay 214 and at armature 220 again completes the energizing series line circuit for the relays 200 and 400.

As a further result of the energization of relay 214, an energizing circuit is completed for relay 201, which, at armature 222, opens the circuit for the relays 200 and 400. These relays are thus held open until the remaining apparatus is restored to normal by the de-energization of slow relay 202.

This operation is more particularly provided in order to de-energize relay 400 which in turn de-energizes relay 402 described hereinbefore and restores the apparatus at the substation to normal. Relay 214 at the office de-energizes when the positive battery is opened by armature 228 of relay 202 by disengaging its front contact. Upon de-energization of relay 214, the energizing circuit for the relay 201 is opened and the original series energizing circuit for relays 200 and 400 is again completed.

The apparatus in both office and substation is now back to normal, but relays 129, 131, etc., have all dropped out in the same manner as when their individual operating keys 114 and 124 are momentarily depressed with the exception that relay 216, which is controlled by the momentary depression of these individual operating keys 114 and 124, is not energized. It will be recalled that relay 216 controls the transmission of the operation control codes for either closing or tripping the circuit breakers following their selection. Accordingly in the present case, no such operation control code will be transmitted but instead, each breaker will be selected in turn and supervisory signals sent to the office to verify the condition of the apparatus.

Briefly, the operations which then occur are as follows:

In view of the fact that relay 129 is de-energized, the apparatus is started into operation in the manner which has been described in detail above. The relay 129 being associated with the first position in the selecting point, only a single selecting impulse will be transmitted from the office to the substation and, as a result, relay 139 at the office and relay 304 at the substation will be energized. Attention is called at this time, to the fact that the first relays 138 and 303 are dummy selecting points and are not considered in the present discussion.

When the selecting relays 139 and 304 are energized, further transmission of the selecting impulse is stopped by the relay 129 which, at the back armature contact, controls the energizing circuit for relay 212. Thereafter a check impulse code is received in the usual manner, but now instead of waiting for the depression of the master control key as was necessary in the operations initiated by the dispatcher, a single impulse is automatically transmitted which terminates the operations on this position.

It will be recalled, that the relay 216 is normally de-energized and is energized only upon the depression of the individual operation key and is subsequently released when the relay 202 is de-energized at the end of the operations. The operation control code, it will further be recalled, is transmitted over the armature 299 of relay 215, relay 215 in turn being energized upon operation of the master key. In the present case, however, relay 216 remains de-energized since no individual key has been depressed. Accordingly, following the selection of a remote unit and the checking thereof, the operation control circuits are immediately completed over the armature at back contact of relay 216, this circuit extending as in the case of the operation code, described hereinbefore.

It will be recalled, that the relay 210 is the relay which stops the transmission of the operation control code or in other words, the last impulse of this code in the present case. In the present case, the circuit for this relay extends from negative battery through winding of relay 210, the armature 298 and front contact of relay 212 (which is at this time energized), front contact and armature 255 of relay 204 (which is also energized), armature 297 and its back contact of de-energized relay 216, the armature and front contact of the first selecting relay 139, the front contact and armature 238 of relay 211 (which is energized at this time) to positive battery.

In this manner, a single selecting impulse is transmitted following the selection and checking. Thereafter, the remote breaker associated with this position sends a supervisory code in accordance with the position and operates the relay 128 in accordance with the position of the breaker.

The relay 415, which, it will be recalled, controls the transmission of the supervisory signals must be operated in the present case, over a different circuit than that previously described, in view of the fact that no operation of the breaker takes place other than a mere verification of the breaker operation. The circuit which energizes relay 415 extends from the negative battery through winding relay 415, front contact and armature of relay 414 and front contact and armature of the first point selecting relay 304 to positive battery.

It will be noted, that this circuit is completed following the checking of the supervisory selection, since each switch checking is followed by a single impulse, as described above, which merely verifies the condition of the apparatus units.

Following the checking and verification of the first point, the relay 129 associated therewith is energized and locked. The above cited operations, are therefore, now again repeated, but this time two selecting impulses are transmitted until the relay corresponding to 131 and associated with the second selected position, is reached. Thereupon the operation described above, is repeated, that is, a checking code is received of the remote selection made. Relay 212 is energized and the de-energization of relay 216 permits transmission of a single impulse to the remote station. A supervisory code combination is transmitted back to the office in accordance with the condition of the breaker at the second point. This same cycle is now repeated for each position until the last position is reached. Following the selection, checking and supervisory code for the last selected position of the relays such as 129, 131, etc., the circuit for relay 218 which is normally closed in multiple over the back contacts of the armatures of these relays is now opened and remains de-energized, preventing further starting operations.

It will be noted that no finder switches either at the dispatching office or substation are provided in my system. I have provided, as part of my invention, simplified means which eliminates the need of any finder switches and which enables the storing of impulses in the case of automatic operation of a number of breakers at the substation simultaneously or during the period while a supervisory code is being transmitted or in the event of an automatic operation of a breaker during the period while the dispatcher is transmitting an operation.

It will be assumed that during the period while the dispatcher is transmitting an operation and the selecting apparatus is in operation, a circuit breaker automatically operates from one position to another.

When the circuit breaker operates, relay 313 is de-energized. Thereupon an energizing circuit is prepared for the relay 417 which is the starting relay for supervisory signals. The circuit, however, is not completed as the apparatus is, at this time, in operation, since relay 418 in that event was previously energized over the front contact and armature 325 of the dummy relay 303 as described hereinbefore.

At the end of the cycle of operation, however, relay 418 will be de-energized in the manner which has been described hereinbefore. Thereupon, a circuit for the energization of relay 417 is completed, at the back contact of armature 435, and relay 417 upon energization, starts the supervisory apparatus into operation.

If more than one relay such as 313 is de-energized, as for example, relay 311, relay 417 will merely be again energized at the end of the cycle of supervisory operation for repeating the operations until all of the relays, such as 311 and 313 etc., have been energized and no further energizing circuit is prepared for the relay 417.

It may be noted that, just as in the case at the office, when the battery is lost momentarily at the substation, all of the relays, such as 311 and 313, etc., individual to circuit breakers or other apparatus units, are de-energized and accordingly, when the battery returns, these relays will control the intermittent energization of the relay 417 at the end of each cycle of supervisory operations to transmit to the office supervisory signals indicating the position of all of the breakers.

It will be noted also that, when the battery at the substation is lost, the series line relays 200 and 400 de-energize, since these relays are energized by the substation battery. The de-energization of relay 200 opens the energizing circuit for the relay 202 which in turn restores apparatus at the office to normal in the manner which has been described hereinbefore.

It may happen, that following an operation which was initiated by the dispatcher, an automatic operation may occur at the substation but that the dispatcher, not being aware of this fact, maintains an individual key depressed in readiness to transmit a second control code as soon as the first control code has been completed.

In order to provide the dispatcher with a picture of the very latest conditions of all of the breakers, it is desirable that, in such a case, the apparatus at the substation automatically operated during this interim get preference in seizing the line to transmit to the office supervisory indications in accordance with the new condition of the breaker, before the dispatcher is enabled to transmit the second control operation which he desires to perform.

A time delay circuit is provided which enables the apparatus at the substation to seize the line before the transmission of the control impulses initiated by the dispatcher can begin. When the first control operation is completed, relay 202 de-energizes and the armature 228 completes an energizing circuit for the relay 217. Relay 217 upon energization opens the circuit for the relay 218 which at armature 241 controls the energization of relay 203. Relay 203, in turn, controls the starting of the apparatus, as described hereinbefore. Accordingly, the starting is delayed during the period while the relay 217 is energized. Following the re-energization of relay 202, as described hereinbefore, relay 217 is deenergized but there is still a delay interval, due to the fact that relay 217 is slow to release.

During this period, a sufficient delay is provided to permit the supervisory apparatus at the substation to seize the line and transmit the supervisory signals.

In the event that the battery at the office, for any reason at all, is interrupted rapidly, it would tend to transmit impulses which simulate the regular cord combination of impulses. Undesirable effects of this condition are prevented by the above described arrangement, whereby a long restoring impulse is first transmitted following the return of the battery and before any selecting impulses can be transmitted.

Similarly, at the substation, the battery may be periodically cut off and put on to simulate impulses. In this case the office receives impulses which appear to be regular code impulses, but false operations are prevented because, upon the permanent return of the substation battery, the substation immediately starts the above verifying functions, before the office has time to commence the transmission of a check code. This results in a failure to check the selection and restores the system to normal.

In the event that the false impulses simulating the signalling impulses are caused by the intermittent opening and closing of the line itself, then the apparatus at the dispatching office and at the substation both operate as receiving apparatus.

Following the receipt of these false impulses, the apparatus at the dispatcher's office will attempt to function as a transmitter and at the same time, the apparatus at the substation will also attempt to function as a transmitter. Provision is made, however, to give the office preference in this case. From the foregoing description it will be apparent that the time interval between the termination of reception of impulses and the beginning of transmission of impulses is determined by the releasing time of the three slow-to-release relays 207, 208 and 209, while, at the substation, this time interval is dependent upon the releasing time of the four slow-to-release relays 407, 408, 409 and 410. As a result the office will be ready for transmission sooner than the substation and accordingly the substation will act as a receiver again. In the normal sequence of operation the substation, after acting as a receiver, should transmit a checking code. Being compelled by the arrangement just described to act as a receiver twice in succession, without an intervening sending function, the substation is not in a position to properly check the code impulses transmitted from the office and as a result the system will either restore to normal or cease to function. In either case, the alarm bell and light at the dispatcher's office will warn the dispatcher that the system is not normal and he will then operate his release key to restore the apparatus to normal.

In the event that the signalling line is seized by the dispatcher for transmitting control operations and the signalling line is simultaneously seized by the supervisory apparatus at the substation in response to an automatic operation thereat for transmitting supervisory signals, then impulses will be transmitted from the control office to the sub-station and from the substation to the control office simultaneously. At the control office, these impulses are transmitted by a relay 201 in the manner already described, and at the substation, these impulses are transmitted by the relay 401. Inasmuch, however, as the impulsing is, in turn, also controlled by the line relays 200 and 400 which are connected in series in the signalling line, the time interval of the impulses is maintained uniform just as in normal operation and the impulses are not mutilated by reason of the fact that they are being transmitted from both ends of the line simultaneously.

The dispatcher's office selecting apparatus functions as a transmitter, and the selecting apparatus at the substation also functions as a transmitter, both in the normal manner.

If the number of impulses transmitted from the substation is greater than the number transmitted from the office, then, after the office has completed its transmission, the relay 203 will be de-energized. At this time, slow relay 205 is still energized, but the apparatus at the dispatcher's office is not expecting any signals, inasmuch as it has just been acting as a transmitter and a time delay is provided between the last impulse transmitted from the dispatcher's office and the first check impulse which is to be received from the substation. This period between the transmission of the last control impulse from the office and the transmission of the first check impulse is determined by the dropping out period for the relays 407, 408, 409 and 410 at the substation. During this period, the slow relay 205 normally drops out, and its armature 257 moves to engage its back contact.

In the present assumed condition, however, an impulse is received at the dispatcher's office almost immediately after the transmission of the last control impulse and during a period while the relay 205 is still up. Accordingly, in response to the receipt of this impulse, an energizing circuit is completed for the relay 206 from negative battery through the winding of the relay 206, front contact and armature 257, back contact and armature 247, front contact and armature 248 and back contact and armature 227 to positive battery. Relay 206 is energized and locks itself over its own armature contact, and the armature 250 opens the impulsing circuit for the counting chain. Accordingly, the counting chain is blocked from further operation, and, when the dispatcher notes that he is not getting a signal from his point lamp, he will operate his release key, thereby restoring the selecting apparatus to normal.

In the event that the number of impulses transmitted from the office is greater than the number of impulses transmitted from the substation, then following the transmission of the last impulse from the substation, the next impulse received from the office will energize the relay 406 over a circuit including the armature 422 and its front contact. As, in the case of the office, following the transmission of the signals from the substation, a time interval is provided between the transmission of the last impulse from the substation and the first impulse to be received from the office, which is long enough to normally permit the relay 405 to drop out and move its armature 433 to engage its back contact. In this case, the time interval is determined by the three slow relays 207, 208 and 209 at the dispatching office. Since, however, in the case assumed, the next impulse is received immediately after the last impulse transmitted from the station, relay 405 does not get a chance to drop out and, as a result, relay 406 is energized as described above. As a result of the energization of relay 406, armature 426 disengages the back contact, opening the impulsing circuit to the counting chain relays and preventing further operation of these relays.

In this case also, the dispatcher, by observing that no indication is received on his check lamp, will be advised of trouble on the system and will operate the release key to restore the apparatus to normal.

In the event that both the office and substation transmit exactly the same number of impulses when they seize the line simultaneously, following the complete transmission of these impulses, the apparatus at both stations will switch over for receiving signals. Inasmuch, however, as neither station is acting as a transmitter at this time, neither station will receive any signals and, accordingly, the dispatcher will again, after an interval, observe that nothing is happening to complete the operations and will operate the release key.

In all of the above assumed conditions, following the restoration of the apparatus to normal, the supervisory operation at the substation will be enabled to seize the line before the dispatcher can again take control, so that here again the dispatcher has available, before he is permitted to make any control operation, the latest information on the condition of the system, and he is in fact automatically prevented from taking control of the line until he obtains this information. As in the case described hereinbefore, following the operation of the reset key, the slow relay 217 is energized after the reset operations have been completed. The line relays 200 and 400 finally are again energized in series, and the apparatus is in condition for operation. At this time, however, the slow relay 217 is still energized, preventing the dispatcher from immediately seizing the line, although the energizing circuit for relay 217 is at this time open and relay 217 will shortly thereafter be de-energized and enable the dispatcher to seize the line.

During the interval, however, while relay 217 is still energized, the apparatus at the substation is enabled to seize the line for the transmission of the supervisory signals.

In all supervisory control systems, it is essential, in view of the fact that the remote circuit breakers are not visible to the dispatcher, that means be provided for preventing the dispatcher from persisting in attempting to close a breaker against a short-circuit, as this may result in damage both to the breaker itself and to the short-circuited system. In the present case, when the dispatcher transmits a closing operation to the substation, the relay, which controls the circuit to the magnet which closes the breaker, is relay 408. As has been described in detail in the above, as soon as the breaker is closed, the auxiliary switches thereon function immediately to open the circuit for the relay 408 which releases, thereby opening the closing circuit for the breaker. If the circuit breaker should, at the instant it is closed, be tripped out, the system will first complete the sending of the supervisory code and thereafter the signaling line is immediately seized by the supervisory apparatus at the substation for transmitting an indication of this condition to the dispatcher, and as has been explained above, this signal reaches the dispatcher before he is enabled to again seize the line for transmitting further control operations, and he is thus apprised of the fact that the circuit breaker has been tripped.

Although in the circuits described above, a specific illustration of one manner of carrying out my invention is described, it will be obvious that there are other systems in which my invention may be applied.

Although my invention is described in connection with supervisory control, it will be obvious that it has adaptations to other forms of signalling systems, and I do not intend to limit myself to the specific system herein used for illustration except insofar as set forth in the appended claims.

I claim as my invention:

1. In a signalling system, a first station, a second station, apparatus units at said second station, a relay chain at each of said stations normally in a code receiving condition, a signalling line connecting said stations, means at each station for conditioning the relay chain thereat to transmit impulse codes, means including said relay chains, said relay chain conditioning means at the first station, and said signalling line for selecting one of said units at said second station from said first station, means responsive to the selection and including said signalling line and said same relay chains and the relay chain conditioning means at the second station for indicating said selection at said first station, means including said same signalling line and said first station relay chain and its conditioning means for transmitting a code combination of impulse conditions from said first to said second station, means including said same relay chain at the second station responsive to said code combination of said impulse conditions for operating said selected unit at said second station, means responsive to the operation of the unit and including said same signalling line and said same relay chain and its conditioning means at said second station for transmitting a code combination of impulse conditions to said first station, and means including said same relay chain at said first station operating in response to said received code for indicating the operation of said selected unit at said second station.

2. In a signalling system, a first station, a second station, a plurality of apparatus units at said second station, a relay chain at each of said stations, a signalling line connecting said stations, and means including means for transferring said relay chains from one function to another for using said same relay chain at each station and said same signalling line for selecting by successive operations of the relay chains in synchronism one of said units at said second station for operation, indicating and checking said selection at said first station and operating said selected unit and indicating said operation at said first station, by means of separate code combinations of impulses individual to the selection, checking, operation and indicating functions to be performed.

3. In a signalling system, a first station, a second station, a plurality of apparatus units at said second station, a relay chain at each of said stations, a signalling line connecting said stations and means including means for automatically transferring the relay chains from one function to another whereby said same relay chain at each station and said same signalling line may be used for selecting by means of one code combination of impulse conditions one of said units at said second station for operation, for indicating and checking said selection at said first station by means of another code combination of impulse conditions, for transmitting a code combination of impulse conditions from said first station to said second station for operating said selected unit and for transmitting another code combination of impulse conditions from the second to the first station for indicating the operation of said selecting unit at said first station.

4. In a signalling system, a first station, a second station, a single signalling circuit connecting said stations, a normally non-operating selecting apparatus in each station, each of said selecting apparatus having a plurality of selecting positions, means at each station for operating the selecting apparatus at both stations in synchronism, apparatus units in each of said selecting positions, means including said single signalling circuit and said operating means at the first station for operating the selecting apparatus at each station from one to another selecting position synchronously with each other for selecting one of said apparatus units for operation, means including said single signalling line and said selecting apparatus at each station and said operating means at the second station for checking the selection of said apparatus unit, means including said single signalling line and said same selecting apparatus at each station and said operating means at the first station for operating said selected apparatus unit, normally energized relay means in each station for controlling said selecting apparatus, operating means and means operable from either station for deenergizing said relay means at each station to start said selecting apparatus in operation.

5. In a signalling system, a first station, a second station, synchronous selecting means at each of said stations having a normal non-operating position, a signalling line connecting said stations, means including synchronous selecting means at both stations and said signalling line for making a selection at the second station from said first station and restoring the selecting means to normal position, means including said signalling line and said same selecting means at both stations for indicating said selection at said first station and again restoring the selecting means to normal position, means including said same signalling line and said same selecting means at the first station for transmitting a code combination of impulse conditions from said first to said second station and restoring the selecting means to normal position, means including said same selecting means at the second station and responsive to said code combination of said impulse conditions for making an operation at said selection and again restoring the selecting means to normal position, means including said same signalling line and said same selecting means at said second station for transmitting a code combination of impulse conditions to said first station, and means including said same selecting means at said first station and operating in response to said received code for indicating the operation made at said second station.

6. In a signalling system, a first station; a second station; a plurality of apparatus units at said second station; a chain of relays at each station; means including circuit connections to said chains of relays for conditioning said relays to make a selection of one of said apparatus units; means for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chains of relays in synchronism; and means including the changed circuit connections of said chains of relays during their second operation in synchronism for checking the selection made at said second station.

7. In a signalling system, a first station; a second station; a plurality of apparatus units at said second station; a chain of relays at each station; means including circuit connections to said chains of relays for conditioning said relays to make a selection of one of said apparatus units; means for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chains of relays in synchronism; means including said chain of relays during their second operation in synchronism for checking the selection made at said second station; means for again changing the circuit connections of said chain of relays at the first and second stations to condition said relay chains for transmission and reception, respectively, of a control code, said relay chains operating means operating thereupon to operate said relays in synchronism; means including said chains of relays in their further operation for transmitting a control code to and receiving it at said second station; and means responsive to said control code for operating said selected unit.

8. In a signalling system, a first station; a second station; a plurality of apparatus units at said second station; signalling devices individual to said apparatus units at said first station; a chain of relays at each station; means including circuit connections to said chains of relays for conditioning said relays to make a selection of one of said apparatus units; means for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chain of relays in synchronism; means including said chain of relays during its second operation in synchronism for checking the selection made at said second station; means for again changing the circuit connections of said chain of relays to condition said chain of relays at the first and second stations for transmission and reception, respectively, of a control code, said relay chain operating means operating thereupon to operate said relays in synchronism; means including said chains of relays in their further operation for transmitting a control code to and receiving it at said second station; means responsive to said control code for operating said selected unit; means for thereupon again changing the circuit connections of said relay chain at the second and first stations for conditioning said relay chains to transmit and receive, respectively, a supervisory signal in accordance with the operation of said unit, said relay operating means thereupon functioning to again operate said chain of relays at each station sequentially and in synchronism with each other; and means including said chain of relays at each station operating in synchronism with each other for operating the signalling device individual to said operated apparatus unit in accordance with the new condition of said unit.

9. In a signalling system, a first station; a second station; a plurality of apparatus units at said second station; signalling devices individual to said apparatus units at said first station; a chain of relays at each station; means including circuit connections to said chain of relays for conditioning said relays to make a selection of one of said apparatus units; means for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chain of relays in synchronism; means including said chain of relays at each station during their second operation in synchronism for checking the selection made at said second station; means for again changing the circuit connections of said chain of relays at the first and second stations to condition said relay chains for transmission and reception, respectively, of a control code, said relay chains operating means operating thereupon to operate said relay chains in synchronism; means including said chains of relays in their further operation for transmitting a control code to and receiving it at said second station; means responsive to said control code for operating said selected unit; means for thereupon again changing the circuit connections of said relay chains at said second and first stations for conditioning said relay chains to transmit and receive, respectively, a supervisory code in accordance with the operation of said unit, said relay operating means thereupon functioning to again operate said relay chains at each of said stations sequentially and in synchronism with each other; means including said chains of relays operating in synchronism with each other for operating the signalling device individual to said operated apparatus unit in accordance with the operation thereof, said relay chains having a normal non-operative position; and means operative following the transmission of said supervisory signals for restoring said relay chains to normal.

10. In a signalling system, a first station; a second station; a plurality of apparatus units at said second station; selecting apparatus at each station; means including circuit connections to said selecting apparatus for conditioning said selecting apparatus to make a selection of one of said apparatus units; means for operating said selecting apparatus at each station sequentially and in synchronism with each other; means including said selecting apparatus at each station for selecting one of said apparatus units for operation; means for thereupon changing the circuit connections of said selecting apparatus at each station, said selecting apparatus operating means being thereupon operated to again operate said selecting apparatus at each station in synchronism; means including said selecting apparatus at each station during their second cycle of operations in synchronism for checking the selection made at said second station; means for again changing the circuit connections of said selecting apparatus at each station to condition said selecting apparatus for transmission of a control code to and the reception thereof at the second station, said selecting apparatus operating means operating thereupon to operate said selecting apparatus at each station in synchronism; means including said selecting apparatus in its further operation for transmitting a control code to said second station; and means responsive to said control code for operating said selected unit.

11. In a signalling system, a first station; a second station; a plurality of apparatus units at said second station; selecting apparatus at each station; means including circuit connections to said selecting apparatus for conditioning said selecting apparatus to make a selection of one of said apparatus units; means for operating said selecting apparatus at each station sequentially and in synchronism with each other; means including said selecting apparatus at each station for selecting one of said apparatus units for operation; means for thereupon changing the circuit connections of said selecting apparatus at each station, said selecting apparatus operating means being thereupon operated to again operate said selecting apparatus in synchronism; means including said selecting apparatus during their second operation in synchronism for checking the selection made at said second station; means for again changing the circuit connections of said selecting apparatus to condition said selecting apparatus for transmission and reception of a control code, said selecting apparatus operating means operating thereupon to operate said selecting apparatus in synchronism; means including said selecting apparatus in its further operation for transmitting a control code to and receiving it at said second station; means responsive to said control code for operating said selected unit; means for thereupon again changing the circuit connections of said selecting apparatus at each station for conditioning said selecting apparatus to transmit a supervisory code to and receive it at the first station in accordance with the operation of said unit, said selecting apparatus operating means thereupon functioning to again operate said selecting apparatus at each station sequentially and in synchronism with each other; means including said selecting apparatus operating in synchronism with each other for operating the signalling device individual to said operating apparatus unit in accordance with the operation thereof, said selecting apparatus having a normal non-operative position, and means operative following the transmission of said supervisory signals for restoring said selecting apparatus to normal.

12. In a signalling system, a first station; a second station; a plurality of apparatus units at said second station; a single signalling channel connecting said stations; a chain of relays at each station; means including circuit connections to said chain of relays for conditioning said relays to make a selection of one of said apparatus units; means including said single signalling channel for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chains of relays in synchronism over said signalling channel; and means including said chains of relays during their second operation in synchronism for checking the selection made at said second station.

13. In a signalling system, a first station; a second station; a plurality of apparatus units at said second station; a single signalling channel connecting said stations; signalling devices individual to said apparatus units at said first station; a chain of relays at each station; means including circuit connections to said chain of relays at each station for conditioning said chains of relays to make a selection of one of said apparatus units when said chain of relays are operating in synchronism; means including said signalling channel for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chain of relays at each station in synchronism over said signalling channel; means including said chains of relays during their second operation in synchronism for checking the selection made at said second station; means for again changing the circuit connections of said chains of relays at said first and second stations to condition said relay chains for transmission and reception, respectively, of a control code, said relay chain operating means operating thereupon to operate said chains of relays in synchronism over said signalling channel; means including said chains of relays in their further operation for transmitting a control code to and receive it at said second station; means responsive to said control code for operating said selected apparatus unit; means for thereupon again changing the circuit connections of said relay chains at each station for conditioning said relay chains to transmit a supervisory code to and receive it at the first station in accordance with the operation of said unit, said relay operating means thereupon functioning to again operate said chain of relays at each station sequentially and in synchronism with each other over said signalling channel for operating the signalling device individual to said operating apparatus unit in accordance with the operation thereof.

14. In a signalling system, a first station; a second station; a plurality of apparatus units at said second station; a single signalling channel connecting said stations; signalling devices individual to said apparatus units at said first station; a chain of relays at each station; means including circuit connections to said chains of relays for conditioning said chains of relays to make a selection of one of said apparatus units; means including said signalling channel for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chain of relays in synchronism over said signalling channel; means including said chains of relays during their second operation in synchronism for checking the selection made at said second station; means for again changing the circuit connections of said chain of relays to condition said relays for transmission of a control code, said relay chain operating means operating thereupon to operate said relays in synchronism over said signalling channel; means including said chains of relays during their further operation for transmitting a control code to and receiving it at said second station; means responsive to said control code for operating said selected unit; means for thereupon again changing the circuit connections of said relay chains at each station for conditioning said relay chains to transmit a supervisory code to and receive it at the first station in accordance with the operation of said unit, said relay operating means thereupon functioning to again operate said chain of relays at each station sequentially and in synchronism with each other over said signalling channel; means including said chain of relays at each station operating in synchronism with each other for operating the signalling device individual to said operating apparatus unit in accordance with the operation thereof, said relay chains having a normal non-operative position; and means operative following the transmission of said supervisory signals for restoring said relay chains to normal.

15. In a signalling system, a first station; a second station; a plurality of apparatus units at said second station; a single signalling channel connecting said stations; signalling devices individual to said apparatus units at said first station; selecting apparatus at each station; means including circuit connections to said selecting apparatus for conditioning said apparatus to make a selection of one of said apparatus units; means including said signalling channel for operating said selecting apparatus at each station sequentially and in synchronism with each other; means including said selecting apparatus at each station for selecting one of said apparatus units for operation; means for thereupon changing the circuit connections of said selecting apparatus at each station, said selecting apparatus operating means being thereupon operated to again operate said selecting apparatus at each station in synchronism over said signalling channel; means including said selecting apparatus at each station during the second operation thereof in synchronism for checking the selection made at said second station; means for again changing the circuit connections of said selecting apparatus at each station to condition said selecting apparatus for transmission of a control code to and the reception of it at the second station, said selecting apparatus operating means operating thereupon to again operate said selecting apparatus in synchronism over said signalling channel; means including said selecting apparatus in the further operation thereof for transmitting a control code to and receiving it at said second station; and means responsive to said control code for operating said selected unit.

16. In a signalling system, a first station; a second station; a plurality of apparatus units at said second station; a chain of relays at each station, each chain of relays being provided with a dummy selection relay to prevent incorrect selection operations by said relay in response to a single impulse; means including circuit connections to said chain of relays at each station for conditioning said chains of relays to make a selection of one of said apparatus units when said chain of relays at each station are operating in synchronism; means for operating said chain of relays at each station sequentially and in synchronism with each other; means including said chain of relays at each station for selecting one of said apparatus units for operation; means for thereupon changing the circuit connections of said chain of relays at each station, said relay chain operating means being thereupon operated to again operate said chain of relays in synchronism; and means including said chain of relays at each station during the second operation thereof in synchronism for checking the selection made at said second station.

17. In a signalling system, a first station; a second station; a plurality of apparatus units at said second station; a chain of relays at each station; means including circuit connections to said chain of relays at each station for conditioning said relays to make a selection of one of said apparatus units when said chains of relays are operating in synchronism; means for operating said chain of relays at each station sequentially and in synchronism with each other; means including said chain of relays at each station for selecting one of said apparatus units for operation; a relay controlled by said chains of relays following the completion of the selecting operation thereof for conditioning said chains of relays for the transmission of a checking code to the first station and its reception thereat to check the selection, said relay chain operating means being thereupon operated to again operate said chains of relays in synchronism; means including said chains of relays during their second operation in synchronism for checking the selection made at said second station; means for thereupon conditioning said relay chains to transmit an operation control code to the second station and receive it thereat and means including said chains of relays and said relay chain operating means for selectively operating said units.

18. In a signalling system, a first station; a second station; a plurality of apparatus units at said second station; a chain of relays at each station; means including circuit connections to said chain of relays at each station for conditioning said chains of relays to make a selection of one of said apparatus units when said chain of relays are operating in synchronism; means for operating said chain of relays at each station sequentially and in synchronism with each other; means including said chain of relays at each station for selecting one of said apparatus units for operation; a relay controlled by said chain of relays following the completion of the selecting operation thereof for conditioning said chains of relays for the transmission of a checking code to the first station and its reception thereat to check the selection, said relay chain operating means being thereupon operated to again operate said chain of relays at each station in synchronism; means including said chains of relays during their second operation in synchronism for checking the selection made at said second station; a relay operated by said chains of relays following the transmission of a checking code for conditioning said chains of relays to transmit an operation control code to the second station and receive it thereat, said relay chain operating means functioning thereupon to operate said relay chains through a second cycle of operations; and means including said further operation of said relay chains for transmitting an operating code to operate said selected apparatus unit.

19. In a signalling system, a first station, a second station, a single signalling channel connecting said stations, a plurality of apparatus units at said second station, a normally non-operating relay chain selector at each station, means at each station for operating said selectors in synchronism, a plurality of signalling devices individual to said apparatus units at said first station, means including said single signalling channel, said relay chain selectors and said selector operating means at the first station for selecting one of said apparatus units for operation and restoring the selectors to normal condition, means including said single signalling channel, said relay chain selectors and said selector operating means at the second station for checking said selection at said first station and restoring the selectors to normal condition, means including said single signalling channel, said relay chain selectors and said selector operating means at the first station for operating said selected apparatus unit and restoring the selectors to normal condition, means including said single signalling channel, said relay chain selectors and said selector operating means at the second station for operating the signalling means individual to said operated apparatus unit for indicating the new condition of said unit and restoring the selectors to normal condition, means whereby control of said units may originate at said office, means whereby said units may operate automatically in response to load conditions, means including said signalling line, said relay chain selectors and said selector operating means at both stations responsive to automatic operations of said units for supervisorily operating said signalling devices, and means whereby said last-mentioned means is rendered ineffective in the event that an automatic operation occurs during a selecting or control operation by the first station for preventing confusion of said control and supervisory operations if an automatic operation of the unit should occur simultaneously with an attempt to control the unit.

20. In a signalling system, a first station, a second station, a plurality of apparatus units at said second station, signalling devices individual to said apparatus units at said first station, normally non-operating selecting means at each station, a single normally energized signalling channel connecting said stations including line relays at each station, means including said single channel and said selecting means at each station and said line relays for selecting one of said apparatus units for operation from said first station and restoring the selecting means at each station to normal, means responsive to the selecting operation and including said single signalling channel and said selecting means at each station and said line relays for checking said remote selection at said first station and restoring the selecting means at each station to normal, means operative following the checking operation and including said single channel and said selecting means at each station and said line relays for operating said selected apparatus unit and restoring the selecting means at each station to normal, and means responsive to the operation of the unit including said single channel and said selecting means at each station for operating said signalling device at said first station individual to said first operating apparatus unit to indicate the new condition of said unit.

21. In a signalling system, a first station, a second station, a plurality of apparatus units at said second station, a single signalling channel connecting said stations, a relay chain at each station having a normal non-operating position, means including said channel for operating said relay chains in synchronism, means including said single channel and relay chains and relay chain operating means for selecting one of said apparatus units for operation from said first station and restoring the relay chains to normal position, means responsive to the selecting operation and including said single channel and said same relay chains and said relay chain operating means for checking said remote selection at said first station and restoring said relay chains to normal position, means including said single channel and said same relay chains and said relay chain operating means for operating said selected apparatus unit, and means whereby said last-mentioned means is effective only if the check identifying the remote selection agrees with the selection desired.

22. In a signalling system, a first station, a second station, a single signalling channel connecting said stations, a plurality of apparatus units at said second station, selecting means at each station having a normal non-operating position, means for operating the selecting means in synchronism, means including said single signalling channel and said selecting means at each station and said operating means for selecting one of said apparatus units for operation and restoring said selecting means at each station to normal, means responsive to the selection and including said single signalling channel and said same selecting means at each station and said operating means for checking said selection at said first station and restoring said selecting means at each station to normal, means including said single signalling channel and said same selecting means at each station and said operating means for operating said selected apparatus unit and restoring said selecting means at each station to normal, means whereby said last-mentioned means is operated only if the check identifying the remote selection agrees with the selection desired, means including circuit connections operative in the event that said check does not agree with the desired selection for automatically restoring said selecting means at each station to normal, and means including circuit connections for automatically restarting said selecting means at each station into operation to again make said remote selection.

23. In a signalling system, a first station, a second station, a plurality of apparatus units at said second station, signalling devices individual to said apparatus units at said first station, normally non-operating single selector means at each station, means at each station for operating the selector means in synchronism, a single signalling channel connecting said stations, means including said single channel and said selector means at each station and said operating means for selectively operating said units from said first station, means whereby said apparatus units are operable automatically to a plurality of positions, means responsive to the operation of any one of said apparatus units to a different position and including said single signalling channel and said selector means at each station and said operating means for selecting its associated signalling device for operation and restoring the selecting means at each station to normal, means responsive to said selection and including said signalling channel and said same selector means at each station and said operating means for checking said selection and restoring the selecting means at each station to normal, and means including said signalling channel and said same selector means at each station and said operating means operative in the event said checking indicates that the selection made agrees with the operated unit for operating said signalling device individual to said operated apparatus unit.

24. In a signalling system, a first station, a second station, a plurality of apparatus units at said second station, signalling devices individual to said apparatus units at said first station, a normally non-operating relay chain at each station, means for operating the relay chains in synchronism, a single signalling channel connecting said stations, means including said single channel and said relay chains and said operating means for selectively operating said units from said first station, means whereby said apparatus units are operable automatically to a plurality of positions, means responsive to the operation of any one of said apparatus units to a different position and including said single signalling channel and said relay chains and said operating means for selecting its associated signalling device for operation and restoring the relay chains at each station to normal condition, means for checking said selection, means including said signalling channel and said same relay chains and said operative means operative in the event said checking indicates that the selection made agrees with the operated unit for operating said indicating device individual to said apparatus unit and restoring the relay chains at each station to normal condition, and means operative in the event that the said checking does not agree with the operated unit for preventing operation of the selected signalling device.

25. In a signalling system, a first station, a second station, a plurality of apparatus units at said second station, signalling devices individual to said apparatus units at said first station, a normally non-operating relay chain at each station, a single signalling channel connecting said stations, means including said single channel and said relay chains for selectively operating said units from said first station, means whereby said apparatus units are operable automatically to a plurality of positions, means responsive to the operation of any one of said apparatus units to a different position and including said single signalling channel and said same relay chains for selecting its associated signalling device for operation and restoring the relay chains to normal, means for checking said selection, means including said signalling channel and said same relay chains operative in the event said checking indicates that the selection made agrees with the operated unit for operating said indicating device individual to said apparatus unit and restoring the relay chains to normal, means operative in the event that the said checking does not agree with the operated unit for preventing operation of the selected signalling device, and means for automatically restarting said selection operation over said signalling channel.

26. In a signalling system, a first station, a second station, a plurality of apparatus units at the second station, a chain of relays at each station, means including circuit connections to said chains of relays for conditioning said relays to make a selection of one of said apparatus units, means for operating said chain of relays at each station sequentially and in synchronism with each other, means including said chain of relays at each station for selecting one of said apparatus units for operation, means for thereupon changing the circuit connections of said chain of relays at each station, said relay chain operating means being thereupon operated to again operate said chains of relays in synchronism, means including said chains of relays during their second operation in synchronism for checking the selection made at the second station, means for again changing the circuit connections of said chains of relays to condition said chains of relays to operate the selected unit, said relay chain operating means being thereupon operated to operate said relay chains in synchronism, means including said relay chains in their further synchronous operation for operating the selected unit.

27. In a signalling system, a first station, a second station, a plurality of apparatus units at the second station, signalling devices individual to the apparatus units at the first station, a chain of relays at each station, means including circuit connections to said chains of relays for conditioning said relays to make a selection of one of said apparatus units, means for operating said chain of relays at each station sequentially and in synchronism with each other, means including said chain of relays at each station for selecting one of said apparatus units for operation, means for thereupon changing the circuit connections of said chain of relays at each station, said relay chain operating means being thereupon operated to again operate said chains of relays in synchronism, means including said chains of relays during their second operation in synchronism for checking the selection made at the second station, means for again changing the circuit connections of said chains of relays to condition said chains of relays to operate the selected unit, said relay chain operating means being thereupon operated to operate said relay chains in synchronism, means including said relay chains in their further synchronous operation for operating the selected unit, means for again changing the circuit connections to said chains of relays to condition said chains of relays to operate the signalling device individual to the operated unit, said relay chain operating means being thereupon operated to operate said relay chains in synchronism, and means including said relay chains in their further synchronous operation for operating said signalling device.

28. In a signalling system, a first station, a second station, a plurality of automatically-operable apparatus units at the second station, a plurality of control units including signalling devices at the first station, each individual to an apparatus unit, a signalling line connecting the stations, normally non-operating selector means at each station operable in synchronism over the signalling line, means responsive to the operation of a control unit at the first station for initiating the synchronous operation of the selector means at both stations to select a corresponding apparatus unit at the second station, means responsive to the automatic operation of an apparatus unit at the second station for initiating the synchronous operation of the selector means at both stations to select a corresponding control unit and signalling device at the first station, means whereby the selector means at each station becomes blocked against further operation in the event of a simultaneous initiation of the operation of the selector means by both stations, and means at the first station whereby the selector means at both stations may be restored to their normal non-operating condition.

29. In a signalling system, a first station, a second station, a plurality of automatically-operable apparatus units at the second station, a plurality of control units including signalling devices at the first station each individual to an apparatus unit, a signalling line connecting the stations, normally non-operating selector means at each station operable in synchronism over the signalling line, means responsive to the operation of a control unit at the first station for initiating the synchronous operation of the selector means at both stations to select a corresponding apparatus unit at the second station, means responsive to the automatic operation of an apparatus unit at the second station for initiating the synchronous operation of the selector means at both stations to select a corresponding control unit and signalling device at the first station, means whereby the selector means at each station becomes blocked against further operation in the event of a simultaneous initiation of the operation of the selector means by both stations, means at the first station operable to restore the selector means at both stations to their normal non-operating condition, and means at the first station for rendering the control units thereat ineffective to reinitiate the synchronous operation of the selector means at both stations for a predetermined time interval, thereby to render the means at the second station responsive to the automatic operation of the apparatus unit to reinitiate the synchronous operation of the selector means at both stations to select the corresponding control unit and signalling device at the first station.

30. In a signalling system, a first station, a second station, a plurality of automatically-operable apparatus units at said second station, selecting means at each station, a single signalling channel connecting said stations, a plurality of indicating means at said first station individual to said apparatus units at said second station, means including said selecting means at each station whereby said apparatus units are selected and selectively controlled from said first station over said signalling channel, means including said selecting means at each station whereby said indicating means are selected and selectively operated in accordance with the controlled or automatic operation of said apparatus units at said second station and over said signalling channel, and means operable following the termination of a selecting or control operation from the first station whereby said selection and operation of said signalling means, in accordance with the changed conditions of said apparatus units resulting from an automatic operation thereof during the time of a control operation from the first station is in progress, are given preferential control of said signalling channel over any further control operations.

31. In a signalling system, a first station, a second station, a plurality of automatically-operable apparatus units at said second station, signalling devices individual to said apparatus units at said first station, a relay chain at each station, a single signalling channel connecting said stations, means including said relay chain at each station whereby said apparatus units are sequentially selected and controlled over said single channel from said first station, means including said relay chain at each station whereby said signalling devices are selectively operated in accordance with the controlled or automatic operation of said apparatus units over said signalling channel, and means at the first station operable to impose a time delay after each selecting and control operation whereby said last-mentioned means invariably obtain preferential control of said signalling channel upon the termination of any selection or control operation in the event of an automatic operation of an apparatus unit during said selection or control operation.

32. In a signalling system, a first station, a second station, a plurality of apparatus units at said first station, corresponding apparatus units at said second station, a signalling line connecting said stations, normally non-operating selector means at each station, means for operating said selector means in synchronism, means including said selector means at each station and said operating means whereby the apparatus units at either station may selectively control the apparatus units at the other station over said signalling line, means at each station whereby said apparatus units at either station may seize said line for said selective control, means whereby, in the event of a simultaneous attempt to seize said line from both stations the selector means at each station performs its operation and becomes blocked against further operation, means at the first station operable to restore the selector means at both stations to normal, and means whereby the second station is thereafter given a preferential control over said line for selectively controlling the apparatus units at the first station.

33. In a signalling system, a first station, a second station, a plurality of apparatus units at said second station, control means at said first station individual to said apparatus units, signalling devices individual to said apparatus units at said first station, a signalling line connecting said stations, normally non-operating selector means at each station, means for operating said selector means in synchronism, means whereby said operating means seizes said signalling line, means whereby said control means including said signalling line and said selector means at each station and said operating means can selectively control associated apparatus units at said second station, means whereby said apparatus units can seize said line, means including said signalling line and said selector means at each station and said operating means whereby said apparatus units selectively control associated signalling devices at the first station in accordance with the operation of said apparatus units, means whereby, in the event that said apparatus units and control means attempt to seize said line simultaneously the selector means at each station is operated to perform its selecting operation and is thereafter rendered ineffective for further operation, manually-operable means at the first station operable to restore the selector means at each station to normal, and means at the first station operable to delay the restarting of the selector means thereat to enable the second station to seize the signalling line in preference to the first station.

34. In a signalling system, a first station, a second station, a single normally energized signalling channel connecting said stations, a plurality of apparatus units at said second station, normally non-operating single selecting means at each station, means at each station operable to restore the selecting means thereat to its normal condition following each operation, means including said single signalling channel and said selecting means at each station for selecting one of said apparatus units for operation by means of an impulse code, means operative following the selection of said units for operation and the restoration of the selecting means at both stations to normal and including said single signalling channel and said same selecting means at each station for checking said selection at said first station by means of an impulse code, means operative following said checking operation and the restoration of the selecting means at both stations to normal and including said single signalling channel and said same selecting means at each station for operating said selected apparatus unit by means of another impulse code, and means whereby said last-mentioned means is operative only if the check identifying the remote selection agrees with the selection desired.

35. In a signalling system, a first station, a second station, a single signalling channel connecting said stations, a plurality of apparatus units at said second station, a relay chain at each station having a normal non-operating condition, means for operating said relay chains in synchronism and restoring the relay chains to normal condition following each operation, means including said single signalling channel and said relay chains and said relay chain operating means for selecting one of said apparatus units for operation and restoring the relay chains to normal condition, means responsive to said selection including said single signalling channel and said same relay chains and relay chain operating means for checking said selection at said first station and again restoring the relay chains to normal condition, means including said single signalling channel and said same relay chains and relay chain operating means for operating said selected apparatus unit and again restoring the relay chains to normal condition, means whereby said last-mentioned means is effective to operate the selected unit only if the check identifying the remote selection agrees with the selection desired, and means including circuit connections operative in the event that said check does not agree with the desired selection for automatically operating said relay chains through a complete operating cycle to their normal non-operating condition.

HANS P. BOSWAU.